US012724971B1

(12) United States Patent
Bhat et al.

(10) Patent No.: US 12,724,971 B1
(45) Date of Patent: Sep. 1, 2026

(54) SECURE DATA RETRIEVAL USING ISOLATED ONTOLOGIES

(71) Applicant: Citibank, N.A., New York, NY (US)

(72) Inventors: Ganesh Prasad Bhat, West Orange, NJ (US); James Randolph Myers, Clearwater Beach, FL (US); Sofia Rahman, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/376,568

(22) Filed: Oct. 31, 2025

(51) Int. Cl.

| | |
|---|---|
| ***G06F 40/295*** | (2020.01) |
| ***G06F 3/04842*** | (2022.01) |
| ***G06F 16/335*** | (2019.01) |
| ***H04L 9/00*** | (2022.01) |

(52) U.S. Cl.
CPC ........ *G06F 40/295* (2020.01); *G06F 3/04842* (2013.01); *G06F 16/335* (2019.01); *H04L 9/008* (2013.01)

(58) Field of Classification Search
CPC .. G06F 40/295; G06F 3/04842; G06F 16/335; H04L 9/008
See application file for complete search history.

(56) References Cited

U.S. PATENT DOCUMENTS 11,095,578 B2 * 8/2021 Jones ...................... G06F 40/30
2021/0073657 A1 * 3/2021 Neelamegam Vetharaman ........... G06F 16/288
2021/0141820 A1 * 5/2021 Vora ...................... G06F 16/337
2022/0350850 A1 * 11/2022 Moon ................... G06F 16/258
2024/0095680 A1 * 3/2024 Lee .................... G06Q 10/1053
2024/0338667 A1 * 10/2024 Flesk ................... G06Q 20/065
2024/0414107 A1 * 12/2024 Andrew .................. H04L 51/02
2025/0117595 A1 * 4/2025 Taheri ..................... G06F 40/40
2025/0139151 A1 * 5/2025 Bianchini ........... G06F 16/3329
2025/0192980 A1 * 6/2025 Patil ...................... G06F 16/254

* cited by examiner

*Primary Examiner* — Richemond Dorvil
*Assistant Examiner* — Zeeshan Mahmood Shaikh
(74) *Attorney, Agent, or Firm* — Perkins Cole LLP; Sumedha Ahuja; Lois Lee

(57) ABSTRACT

Systems and methods for secure data-retrieval are disclosed herein. A system for secure data retrieval initializes a session between a user-specific model executing locally at a user device and an entity-specific model at an entity device. The user-specific model has access to a locally stored ontology comprising interaction data. The system can receive a request from the entity device, where resolving the request requires access to the interaction data from the ontology. The system inputs the request into the user-specific model to generate a query for obtaining interaction data from one or more classes of the ontology associated with the request. The system can generate a set of filtering operations, which can be applied to the interaction data to obtain filtered data. The system can use the filtered data to generate and transmit a response.

20 Claims, 17 Drawing Sheets

400 request{
    timestamp: 10:45:52; 10/10/2025;

request: "Please provide a summary of Jane Doe's successful project \
    collaborations from the past two years, along with her preferred communication \
    channels."

entity_identifier: "2kjnrkejsnd3"

```
SELECT ?projectName ?role ?endDate ?channel
WHERE {
 ?project a ex:Project ;
         ex:participant ex:JaneDoe ;
         ex:projectName ?projectName ;
         ex:role ?role ;
         ex:endDate ?endDate ;
         ex:outcome "Success" .
 FILTER (?endDate >= "2024-10-23"^^xsd:date)

 ex:JaneDoe ex:preferredChannel ?channel .
}
```

| Project Name | Role | End Date | Preferred Channel |
|---|---|---|---|
| Project Atlas | Lead Developer | 2025-06-30 | Slack |
| Project Mercury | Contributor | 2025-09-15 | Email |

```
response{
        response_text:
            "Jane Doe – Project Collaboration Summary & Communication Preferences
            Successful Project Collaborations (2023–2025):
                Project Atlas – Role: Lead Developer
                ...
            Preferred Communication Channels:
                Microsoft Teams
                Email
            Additional Notes:
                Collaboration style: Proactive, cross-functional teamwork
                Privacy settings: Detailed project outcomes withheld per user preference"
}
```

FIG. 8

SECURE DATA RETRIEVAL USING ISOLATED ONTOLOGIES

BACKGROUND

Large-scale organizations frequently struggle to identify and distribute (e.g., assign) user-aligned and high-priority tasks to agents with precision, primarily due to a lack of detailed insight into each individual's career history, skill set, patterns, and context-specific strengths. Traditional enterprise systems typically operate on generic profiles, resulting in an inability to recognize nuanced competencies or evolving interests. Furthermore, due to privacy concerns, as agents move from entity to entity over time, an organization must reaccumulate data relating to the user, essentially losing data relating to previous employment. Without access to granular, user-specific data, or the ability to analyze complex personal trajectories, entities risk inefficient task allocation, missed opportunities for skill development, and diminished organizational productivity. The absence of robust, personalized intelligence also leads to fragmented workflows, latency in resolving operational checks, such as resource coordination, incident reporting, etc.

However, entities cannot simply store such granular, individualized data in a centralized location since the confidentiality of such data is paramount. For example, unauthorized access or disclosure to an employee's patterns or personal information enables malicious actors to engage in activities such as identity theft, financial fraud, and other forms of cybercrime (e.g., by pretending to be the employee at the entity). As a result, there is a growing need for implementation of a robust system that can store and learn an employee's patterns and data over time while maintaining privacy and security via cybersecurity measures to safeguard sensitive information from unauthorized use.

SUMMARY

Accordingly, there exists a need for improved methods and systems that enable an organization to identify tasks, such as from a plurality of tasks, that are user-aligned and high priority based on a user's personal history, data, and/or context. In particular, there exists a need for secure, compliant, and efficient sharing of sensitive data that can be used, e.g., in identifying user-aligned and/or high priority tasks for a workflow, while mitigating associated security risks.

One mechanism for doing so involves using a user-specific machine learning model that can access and identify relevant user data stored locally on a user device, or in an encrypted format such that it is only accessible to the user or user device. The user-specific model can interface with an entity-specific model having access to an entity's ontology. By leveraging communications from the user device, the entity device may generate recommendations for tasks for a user to perform and/or the user device can also leverage communications from the entity device to generate recommendations for tasks for a user that are user-aligned and/or high priority. According to some implementations, the user-device can store the user-specific data in an ontology format such that the model can efficiently access the data and minimize latency when retrieving data for performing operations.

In particular, an ontology-based data retrieval system can be used to securely and efficiently retrieve data using isolated ontologies. The ontology-based data retrieval system can initialize a communication session between a user-specific agentic model executing locally at a user device and an entity-specific agentic model at an entity device (e.g., of an organization), so that communications between the two can be securely transmitted while sensitive data at each side can be isolated and remain within the control of the corresponding device. According to some implementations, the user-specific agentic model has access to a user-specific ontology comprising interaction data between a corresponding user and one or more entities. For example, the ontology may include data about the user's work history, user's skills, user's patterns at different companies, organizations, etc. As described herein, in order to provide users with complete control over their data, the ontology can be stored locally on the user's device and can further be isolated from the entity such that the entity can only (e.g., exclusively) obtain such data through communication with a user-specific agentic model executed on the user device, which can act to filter and limit the data that is transmitted through the communication session.

In particular, the user-specific agentic model can receive, via the communication session, a request from the entity device. Resolving the request can require, for example, access to the interaction data from the user-specific ontology. For example, the request can require access to a user's sensitive or personal data that is stored on the user-specific ontology. One example of sensitive information on the user-specific ontology can include a user's dependents, medical conditions, accommodations needed, or a class of data set by the entity to be personal, etc. For example, a request for forming a new team can require information about past interpersonal conflicts to avoid repeating problematic pairings. Similarly, if the request is for project scheduling, health or family status can be needed to ensure the user can participate fully.

In order to quickly identify relevant data needed to resolve the request without utilizing computational resources to scan the entire corpus of user data, the system can use the user-specific agentic model to generate a query based on the request. For example, the user-specific agentic model can parse and extract semantic elements from the request. The semantic elements from the request can then be used to generate a query that can be used to obtain interaction data from one or more classes of the user-specific ontology associated with the request. Following the example for a request for forming a new team, the system can determine key semantic elements (e.g., words, phrases, chunks) from the request, such as "team," and "compatibility," and "conflicts," and use these elements to generate a query to query and obtain data from the locally stored, or remotely stored and encrypted, ontology. The system can pass the query to the ontology and obtain the interaction data. In some examples, if the query yields nothing from the ontology, the failure can be passed to the user-specific agentic model and the model can generate new search queries excluding search terms previously used.

The ontology-based data retrieval system can then generate a set of filtering operations to modulate the user-specific data that is obtained from the ontology. For example, filtering operations can include filtering operations for data transmission that a user has previously set (e.g., user-set filtering operations). For example, a user can choose to never disclose a medical illness or data from a previous employer. Similarly, the filtering operations can include context-based filtering operations that are generated dynamically based on the request. For example, if the request relates to interpersonal data, the user-specific agentic model can generate filtering operations, such as to remove medical data, or if the request only requires a binary answer, the filtering operation can be to transform the obtained data and output a binary answer. The system can then apply the set of filtering operations to the interaction data to obtain filtered data.

As described herein, this output data may be transmitted, such as to enable identification of user-aligned and/or high priority tasks. In some implementations, the user-specific agentic model and ontology-based data retrieval system can construct, as the filtered output, a privacy-preserving model of the individual's task preferences, skills, availability, and constraints represented as an ontology projection, which includes a shareable and structured portion of the overall ontology filtered for privacy. Similarly, the entity-specific agentic model may model organizational requirements, including task urgency, strategic priorities, resource needs, and preferred skill allocations, and aggregate these into a comprehensive ontology that reflects team and project goals in both scope and timing.

User-specific agentic model may communicate, e.g., via a communication session, only the relevant, permissioned elements of its ontology (for example, "available for compliance tasks on Tuesdays, prefers analytics assignments") to the entity-specific agentic model. In turn, the entity-specific agentic model can share an ontological projection of its own ontology, e.g., task summaries and required skillsets. In order to identify relevant tasks, the agentic models can undergo a negotiation process whereby the entity device can compile a candidate list of tasks that align with the user-specific ontology. The user-specific agentic model can then score these candidate list of tasks according to how well they fit the user's interests, historical performance, and current workload. Advanced constraint satisfaction algorithms can be used to detect any conflicts (e.g., such as competing urgent tasks that exceed available work hours), and in case of such conflicts, the user-specific agentic model can propose compromises using federated learning recommendations (e.g., accepting one task while delegating another).

For example, as described herein, federated decision-making can be achieved via multi-agent optimization, where both agentic models assign scores to potential allocations, considering urgency and user-alignment. Reinforcement learning and multi-armed bandit algorithms can be employed at both ends to converge towards the most beneficial solution. The user-specific agentic model may transmit a proposed task allocation plan to the entity-specific agentic model, which may accept, suggest modifications, or enter further negotiation until consensus is achieved or the matter is escalated to an operator, e.g., manager for any unresolved disputes.

Upon agreement, the allocation can be finalized and the entity-specific agentic model can assign the task to the user, while the user device, e.g., user-specific agentic model integrates it into the user's prioritized workflow. In some implementations, the process is continuously refined through a feedback loop such that after each task is accepted, completed, or declined, user feedback is incorporated, allowing both agentic models to adjust future recommendations. This feedback may be processed locally to retain privacy and, when handled by the entity device, can be aggregated using differential privacy techniques to ensure individual user data remains secure.

By doing so, the system enables a personalized experience that is not limited to organizational boundaries. Instead, it dynamically adapts and evolves by leveraging an individual's accumulated experiences across diverse contexts and timeframes. In particular, the system seamlessly merges a user's personal history, preferences, and learning spanning multiple organizations, with the explicit expectations and strategic goals of the current entity. As a result, task allocation and prioritization become deeply individualized, enabling organizations to align their objectives with the unique capabilities, evolving interests, and life circumstances of each person.

In some implementations, the user-set filtering operations are stored on a blockchain, such as part of an on-chain program (e.g., smart contract). By doing so, the system can ensure that only the user via the user device modifies permissions and limitations for filtering the data prior to transmitting the data to external devices. In particular, in a first instance, such as when the user is enrolled in the system, the system can obtain, at the user device, one or more user inputs from a user indicating their preferences (e.g., level of risk, types of data that should not be exposed, can be exposed, etc.). The system can then generate, using the user inputs, at least one user-set filtering operation, such as to identify and redact certain types of data. The system can generate an on-chain program storing user-set filtering operations and transmit, to a node of a blockchain, the on-chain program for deployment. In particular, the system can use an ""ownership"" or ""access control"" pattern based on the user-associated cryptography-based storage application to ensure that only the user can change and modify the user-set filtering operations.

In this example, once the system obtains the data from the ontology and must perform filtering operations, and in particular, when the system must obtain user-set filtering operations for data transmission, it can do so by transmitting (e.g., to the node of a blockchain) a call to a function of the on-chain program storing user-set filtering operations. In response, the system can obtain, from the node, the one or more user-set filtering operations. The set of filtering operations can include, for example, a temporal filter configured to remove data generated during a specified period of time (e.g., user specified, entity specified, request specified), a context-based filter configured to remove data not relevant to the request, and/or a data resolution filter configured to mask sensitive metadata and generate generalized data.

In some implementations, once the relevant data has been filtered, the system can generate a response using the user-specific agentic model. As described herein, because the response is generated using filtering operations that are both user-set and request-specific, the response can limit the transmitted information to that which is required to resolve the request and will not provide extraneous data that can be used by bad actors. In some examples, the response can include a set of ontological elements where elements that are filtered through the filtering operations are removed or redacted. Moreover, integrating these filtering mechanisms with access controls and audit trails provides a further layer of protection, confirming that data shared matches the user's entitlements and creating an accountable record of what information was accessed. As a result, the principle of least privilege is upheld, the attack surface for bad actors is significantly reduced, and the risk of data spillage is minimized. This approach adheres to industry best practices for data minimization, as outlined by standards such as NIST SP 800-171 and the EU GDPR.

Furthermore, when the system transmits the generated response, such as via the communication session, the communication session can be a secure communication session, and can use zero-knowledge proofs and/or the like to maintain privacy but still be able to validate data so as to prevent cybersecurity attacks such as Distributed Denial-of- Service (DDoS) attacks. Additionally, implementing rate-limiting and challenge-response mechanisms within the secure session can mitigate DDoS attacks by verifying the legitimacy of request sources and preventing automated, excessive, or malicious traffic from overwhelming system resources. Cryptographic techniques such as mutual authentication and digital signatures further validate both parties in the session, guaranteeing data integrity while shielding private details from unauthorized access.

As described herein, the communication session can act as a secure communication exchange. Thus, not only does the user device transmit data from the user-specific ontology via the communication session, but the user device can also receive data. For example, the entity device can transmit data, such as from an entity-specific ontology, including data regarding new project launches, team changes, skill requirements, or opportunity alerts. In particular, the user device can receive, via the communication session, interaction data relating to the user from an entity-specific ontology stored locally on the entity device and update the user-specific ontology using the interaction data. Further, in some implementations, in order to ensure privacy and security among the devices, the model weights of the user-specific agentic model can be encrypted, such as using homomorphic encryption, such that only an authorized user can update the model.

In some implementations, the system can determine that the request cannot be resolved without requisite interaction data that is filtered out when applying the user-set filtering operations. The system can generate a notification with an actionable element for display at the user device, such as a button or an input field. The actionable element, if selected by the user, can enable the requisite interaction data to be used in generating the response. That is, the user can permit an override of one or more filtering operations such that a response can be provided to the entity device. In particular, the system can append the requisite interaction data to the filtered data and input the combined data to the user-specific model to generate a response.

Various other aspects, features, and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 illustrates a data structure of an exemplary request, in accordance with one or more embodiments of this disclosure.

FIG. 5 illustrates a data structure for an exemplary query, e.g., to obtain data from the user-specific ontology, in accordance with one or more embodiments of this disclosure.

FIG. 6 illustrates exemplary interaction data obtained from a user-specific ontology, e.g., responsive to a query, in accordance with one or more embodiments of this disclosure.

FIG. 8 illustrates an exemplary response generated using the filtered data, in accordance with one or more embodiments of this disclosure.

DETAILED DESCRIPTION

Figure 1:
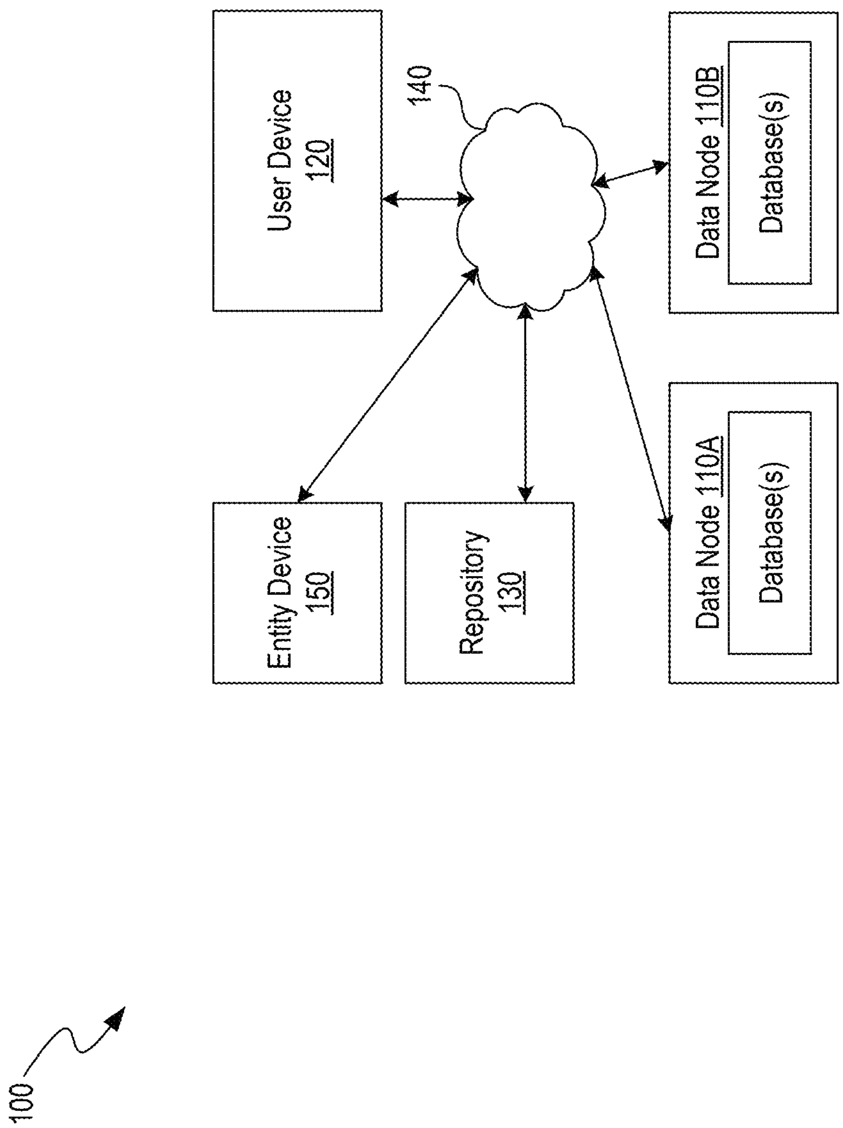
FIG. 1 shows an illustrative environment for secure data retrieval and transmittal using isolated ontologies, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments can be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Attempting to create a system to securely and efficiently identify user-aligned and high-priority tasks for distribution created several unknowns in conventional approaches. In particular, in order to accurately identify such tasks required access to both sensitive user-specific data and entity-specific data. Transmitting user-specific data, especially where the user retains local control over data access and privacy through sovereign agentic models, in view of the available conventional approaches, created significant technological uncertainty. Creating such a system required addressing several unknowns in conventional approaches to privacy-preserving distributed artificial intelligence (AI) systems, including unknowns in implementation of secure ontology isolation, context-aware data filtering, and real-time permission management. Similarly, conventional approaches in enterprise data sharing protocols did not adequately balance latency, memory efficiency, and privacy, resulting in risks of data leaks with static, overly broad data sharing rules or, on the other hand, inefficient request resolution because the system lacks enough data to adequately generate a response. Furthermore, overly broad data sharing rules also leads to a higher amount of data for processing, which expends computational resources unnecessarily. By contrast, the disclosed methods dynamically filter data and thus reduce the number of computation resources without compromising the resolution of data needed for efficiently resolving the request.

Conventional approaches rely on centralized cloud-based data aggregation and static permission models, which do not prevent inadvertent exposure of sensitive user data or adapt to evolving user contexts. For example, a conventional system can transmit entire user profiles via unencrypted channels and fail to dynamically filter or mask extraneous information that could be exploited by malicious actors. Conventional approaches typically involve organization-controlled data intake and batch processing, which cannot provide instant, context-refined access while ensuring robust privacy and minimizing non-essential data transmission. Conversely, the disclosed system leverages personalized, locally executed agentic models that interact with entity-specific models via end-to-end encrypted sessions, dynamically querying ontologies using smart user-set and context-based filters that minimize memory use, reduce latency, and strictly control the scope of transmitted data. This structure both maximizes security by never exposing full user data sets and delivers rapid, relevant responses for organizational onboarding and collaboration.

To overcome the technological uncertainties, the inventors systematically evaluated multiple design alternatives. For example, the inventors compared the performance and privacy of agentic models against server-based LLMs. The inventors prototyped various ontology structures and selective sharing protocols for personalized recommendation efficiency, which allowed the inventors to empirically determine optimal tradeoffs between response latency, memory requirements, and privacy-preserving accuracy for secure, user-controlled data transmission.

The use of stateless cloud relay architectures proved to be problematic for guaranteeing real-time privacy and securing ontology boundaries, as it failed to prevent transmission of redundant user data and exacerbated the risk of unauthorized access, leading to unacceptable latency and heightened susceptibility to exploits. Similarly, batch-processing-based ontology synchronization did not accommodate instantaneous privacy boundary enforcement, resulting in significant delays and exposure of user interactions outside authorized contexts. Further, basic token-based permission controls ignored the potential benefits of blockchain-based filtering operation logs and immutable audit trails, thus generating uncertainty around filter modification security and user autonomy in granting permissions.

Thus, the inventors experimented with different methods for balancing request-response efficiency and secure real-time access to personalized, context-relevant user ontology data. For example, the inventors benchmarked encrypted query routing, tested smart contract enforcement of user-set filter operations, and implemented differential privacy mechanisms to mask sensitive metadata before response transmission to identify the most efficient and effective approaches. Additionally, the inventors systematically evaluated different strategies for real-time context-aware selective data sharing, including experimentations with temporal, context, and data resolution filters deployed via immutable on-chain scripts. The inventors evaluated, for example, different methods of logging all filtering actions and permission changes using blockchain nodes to ensure accountability and user autonomy over filter management, such as deploying on-chain programs for storing and invoking user-set filtering operations, mapped directly to specific ontology classes, and enforcing access controls via smart contract permissions only modifiable by the user.

As described herein, large-scale entities often struggle to identify and distribute tasks that are relevant to individual members at the entity, such as for executing a workflow. Conventional systems typically fail to assign user-aligned and high-priority tasks to agents with precision due to a lack of detailed insight into each individual's career history, skill set, patterns, and context-specific strengths. Conventional enterprise platforms generally rely on standardized user profiles, which prevents them from accurately identifying individuals' specialized capabilities or adapting to changes in personal interests over time. Additionally, strict privacy protocols mean that when employees transition between organizations, each new entity is required to rebuild its understanding of that individual from scratch, resulting in the loss of detailed experience and data accumulated during previous roles. Without access to granular, user-specific data, or the ability to analyze complex personal trajectories, entities risk inefficient task allocation, missed opportunities for skill development, and diminished organizational productivity. In particular, the absence of user-specific intelligence and data also leads to fragmented workflows, for example, because identifying the wrong agent to a task may slow or pause the workflow.

Thus, the disclosed methods and systems enable a user-specific model to have access to a user-specific data store and/or ontology linked to a user, such that a user can continue to travel from entity to entity with a model that continues to train on a user-specific data store that continually updates with new experiences and interactions the user has at an entity. For example, when a user interacts with an entity, e.g., such as when an employee is in employment with an organization, and performs various tasks relating to a specific skill and urgency level, the user-specific data store or ontology may store this information, and the user-specific model may access this information and make inferences about the kinds of tasks and deadlines the user may be best equipped to take on. In the example provided, the model may determine that the user is proficient in the specific skill and can complete tasks that require this skill within short periods of time.

As described herein, in order to facilitate a system that can identify and assign high-priority or user-aligned tasks, the system may enable the user device and the entity device to store their own sensitive information and negotiate tasks using filtered data. In particular, each party can operate a device that locally stores an isolated ontology of user-specific (e.g., personal, sensitive, etc.) data that is managed by an agentic model. For example, environment 100 of FIG. 1 shows an illustrative system for secure data retrieval using isolated ontologies. Environment 100 includes a user device 120, which executes ontology-based data retrieval system 160, entity device 150, and repository 130. According to some implementations, the environment 100 can further include data node 110A and data node 110B, such as of a blockchain, which can be used to access immutable functions used in filtering user data or for immutably logging access to the ontology.

Figure 2:
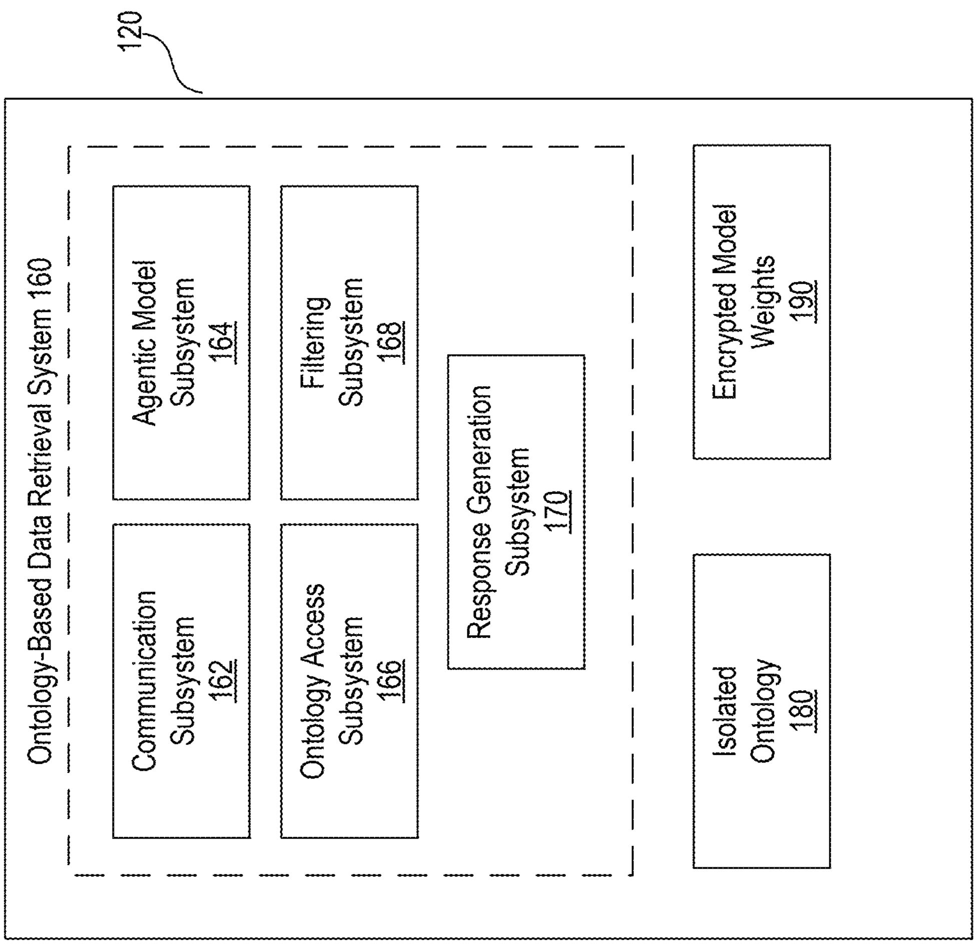
FIG. 2 shows an illustrative system for secure data retrieval and transmittal using isolated ontologies, in accordance with one or more embodiments of this disclosure.

The environment 100 can facilitate secure communication between the user device 120 and the entity device 150. For example, as shown in FIG. 2, the user device 120 can include an isolated ontology 180 that stores user-specific data locally, and the ontology-based data retrieval system 160 can have access (e.g., exclusive access) to the user-specific ontology to resolve requests. Similarly, the entity device can have access to an entity-specific agentic model that manages an ontology storing data associated with the entity, whether isolated or shared, or a combination of both.

As referred to herein, an ontology can be a formal specification (e.g., data structure) defining how concepts within a particular domain are defined and related to one another. An ontology can also be referred to herein as a knowledge map. In one example, the ontology can detail entities (e.g., people, places, objects, or events), their attributes (e.g., descriptive properties), and the rules or relationships connecting them. In particular, the ontology can be stored in one or more various formats depending on the system requirements and intended use. For example, the ontology can be stored and managed in specialized databases called triple stores. Alternatively, or additionally, the ontology can be stored using the Web Ontology Language (OWL), an XML-based format or represented as graphs. For example, the graph can have nodes corresponding to entities and relationships can be represented as edges. The graph can be stored in graph databases to manage the interconnected structure. Alternatively, or additionally, the ontology can be expressed in hierarchical structures like JSON or relational database tables, though these formats can limit the depth of reasoning possible.

As described herein, ontology-based data retrieval system 160 of environment 100 can execute instructions for extracting relevant data from an isolated ontology (e.g., stored as a knowledge graph) and securely resolving a request without enabling access to sensitive data. FIG. 2 shows an illustrative ontology-based data retrieval system 160, in accordance with one or more embodiments of this disclosure. Ontology-based data retrieval system 160 can include several subsystems, each configured to perform one or more steps of the methods described herein, such as communication subsystem 162, agentic model subsystem 164, ontology access subsystem 166, filtering subsystem 168, and response generation subsystem 170. The user device, as described herein, can include isolated ontology 180. In some implementations, the user device can store the model weights for the user-specific agentic model that manages the ontology in an encrypted format, e.g., as encrypted model weights 190 (e.g., encrypted using a secret, unique, and/or private key of the user device). In one implementation, the encrypted model weights are encrypted using homomorphic encryption. Ontology-based data retrieval system 160 of user device 120 can include software, hardware, or a combination of the two. For example, ontology-based data retrieval system 160 can be hosted on a physical server or a virtual server that is running on a physical computer system.

The isolated ontology 180 of the entity device can include interaction data of the user. The interaction data can include a first portion that is of a classification for which more narrow sets of filtering operations are to be applied. Similarly, the interaction data can include a second portion that is of a classification for which broader sets of filtering operations are to be applied. For example, the first portion of interaction data can include core personal data which can never be shared except as an abstracted data point. Core personal data can include personal aspirations, private work patterns, sensitive preferences, historical contexts, and/or the like. A second portion of interaction data stored at the ontology can include selectively shareable data which can be shared but limited to being shared based on a user's preferences. The second portion can include data such as skill profiles, availability patterns, collaboration preferences, and project interests and/or the like. As described herein, the ontology 180 can include interaction data that spans interactions with different entities over time.

According to one embodiment, rather than being locally stored at the user device, the user-specific ontology can be stored remotely, such as on a remote device. In this implementation, the user-specific ontology, or components of the ontology can be encrypted, such as using a secret key associated with the user device (e.g., user account or wallet). By doing so, the ontology can only be accessible by the user device. Similarly, the entity-specific ontology can be encrypted, such as using a secret key associated with the entity device.

According to some implementations, an ontology, such as stored on a user or entity device, can be significantly enhanced by integrating a local vector database for knowledge storage. In this example, the ontology provides a structured framework defining relationships between legal concepts, documents, or entities, while the local vector database enables high-dimensional semantic indexing and efficient similarity search across these assets. For example, every ontological class or instance, such as "contract," "statute," or "client memo," can be associated with a corresponding vector embedding stored locally. By doing so, the knowledge graph can be enabled to handle and identify both explicit relationships (e.g., defined in the ontology) and implicit semantic associations (e.g., captured by vector similarities).

The ontology-based data retrieval system 160 can be configured to initialize a communication session between the user device 120 and the entity device 150. In particular, the communication subsystem 162 of ontology-based data retrieval system 160 can initialize a communication session between a user-specific agentic model executing locally at a user device and an entity-specific agentic model at an entity device. The user-specific agentic model has access to a locally stored user-specific ontology comprising interaction data between a corresponding user and entity. Communication subsystem 162 can include software components, hardware components, or a combination of both. For example, communication subsystem 162 can include a network card (e.g., a wireless network card and/or a wired network card) that is associated with software to drive the card. Communication subsystem 162 can pass at least a portion of the data, or a pointer to the data in memory, to other subsystems such as agentic model subsystem 164, ontology access subsystem 166, filtering subsystem 168, and response generation subsystem 170.

According to some implementations, initializing the communication session can occur responsive to a user request or initiation of an information exchange with an organization. The session can begin with mutual authentication, such as by leveraging public-key cryptography and zero-knowledge proofs to verify identities without exposing sensitive credentials. In some implementations, communication over the communication session can further be conducted over end-to-end encrypted channels using protocols such as TLS 1.3 and Signal Protocol, ensuring that all transmitted data, including requests, ontology elements, and contextual updates, remain confidential and tamper-resistant during transit.

In one embodiment, the system utilizes an API gateway configured for secure, bidirectional communication between the user-specific agentic model and the entity-specific agentic model residing on individual user devices and an entity device, respectively. The API gateway can act to perform operations enforcing multi-factor authentication and role-based access control for every request and response exchanged between the agents. The gateway can include security modules, including but not limited to, an encryption module implementing end-to-end TLS/SSL encryption for all payload, an auditing module configured to generate immutable logs of all communication events in compliance with regulatory frameworks (e.g., GDPR, CCPA), a routing engine for dynamic orchestration of REST/gRPC/WebRTC traffic to designated microservices and AI endpoints, and a privacy-enforcement module capable of granular ontology-based data filtering, anonymization, and permission flagging prior to transmission.

Upon receipt of an incoming communication from a user-specific or entity-specific agent, the gateway can parse the received payload for integrity and policy adherence, validate credentials against federated identity providers, and transact only those ontological elements explicitly permitted by individual user policies and organizational governance protocols. Responses generated by organizational AI infrastructure are likewise filtered by the gateway to redact or obfuscate sensitive information per prevailing context and contractual constraints. The gateway can leverage protocols including zero-knowledge proofs and differential privacy mechanisms to allow secure semantic matching and aggregate insight exchange without direct exposure of raw data.

Figure 3:
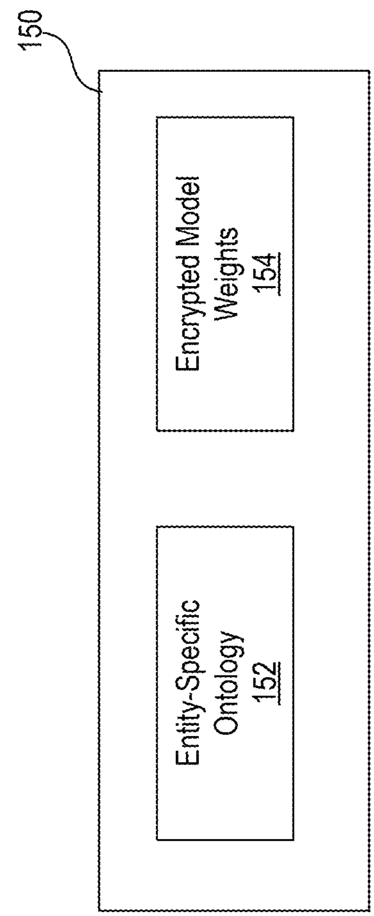
FIG. 3 illustrates an exemplary entity device, in accordance with one or more embodiments of this disclosure.

The ontology-based data retrieval system 160 can receive, at the communication subsystem 162 via the communication session, a request from the entity device 150. For example, the entity device 150 can be operated by and associated with an entity, e.g., an organization at which the user can be affiliated or a member of. For example, FIG. 3 illustrates an exemplary entity device 150, in accordance with one or more embodiments of this disclosure. Although only one entity device is depicted in the example of FIG. 1, the user device 120 can be communicatively coupled to multiple entity devices corresponding to the same or different entities. The user at the user device 120 can be a member or constituent of the entity at the entity device. The entity device can include an entity-specific ontology 152 and encrypted model weights 154, e.g., encrypted using a unique, private key of the entity device, e.g., similarly to how the encrypted model weights of the user device are encrypted using a unique, private key of the user device (and/or user wallet).

According to some implementations, the entity ontology can include a structured representation of an organization's core knowledge, relationships, and operational attributes that can include comprehensive data about organizational structure, such as departments, team compositions, reporting hierarchies, and leadership roles, as well as records of both current and historical projects, programs, availability, personnel allocations, knowledge repositories, public projects, available resources, and scheduling data critical objectives. In some examples, the entity-specific ontology can be in the form of a knowledge graph or include a knowledge graph. The ontology can further include individual and collective skills, capabilities, and expertise profiles, enabling sophisticated mapping between personnel and organizational needs. In some implementations, the user-specific agentic model can, upon receiving the update, access the updated data and determine one or more actionable items, tasks, or processes available or relevant to the user. In one implementation, the agentic model can use the updated data, the location of the updated data in the user-specific ontology, and other data from the ontology to generate a notification or actionable items, tasks, or processes and can push the tasks to the entity device as well. For example, the system can determine based on the user's personal goals under the ontology that they are interested in learning ML, and based on data received from the entity, e.g., that someone is hosting a workshop, the system can generate a task or notification such as "John, based on your personal goal to learn ML, Sarah is hosting a workshop tomorrow. Shall I RSVP?." According to some implementations, the updates can occur in real time and can be streamed continuously to the user device as changes are made at the entity device.

As described herein, the ontology-based data retrieval system 160 can receive the request, where, for example, resolving the request can require access to interaction data from the user-specific ontology, such as in the form of ontology elements. As referred to herein, the interaction data can include data relating to a user's interactions with the entity, or to other entities historically. The interaction data can include in part or in whole, data that is sensitive or that is mandated, e.g., by a legal requirement or based on entity requirements to stay within the control of the user to whom the data relates.

FIG. 4 illustrates a data structure of an exemplary request, in accordance with one or more embodiments of this disclosure. The data structure 400 can include a natural language input for the request, e.g., "Please provide a summary of Jane Doe's successful project collaborations from the past two years, along with her preferred communication channels." The data structure 400 can also include additional information, such as a timestamp indicating when the request was generated and/or received at the system, or an entity identifier which can be used to uniquely identify the entity at the user device. The entity identifier can include an alphanumeric string value, for example. In another example, the request may be more general such as "we got a batch of tasks, please confirm whether the user can be scheduled for the upcoming weekly compliance audit session this Tuesday afternoon, and indicate if they are interested in joining the newly formed analytics working group for upcoming data review projects." In some implementations, as described herein, the request may further include ontological elements from the entity-specific ontology that are relevant.

The communication subsystem 162 can pass the request, or a pointer to the data in memory to the agentic model subsystem 164. According to some implementations, as described herein, the communication subsystem 162 can convert, modulate, or otherwise transform the request from a first modality to a second modality. If the communication subsystem 162 does not have the ability to convert data of the modality in which the request is obtained, the communication subsystem 162 may transmit the request to a different system that can convert, modulate, or otherwise transform the request to a second modality that can be ingested by the agentic model.

The agentic model subsystem 164 can be configured to execute a user-specific agentic model. The agentic model subsystem 164 can be configured to input the request into the user-specific agentic model to generate a query for obtaining interaction data from one or more classes of the user-specific ontology associated with the request. In particular, the agentic model subsystem 164 can parse the request to identify a set of semantic elements, e.g., which can refer to the fundamental constructs within a data ontology that embody distinct meanings, relationships, and attributes relevant to the domain being modeled. These elements include entities (such as people, projects, organizations), properties (characteristics like names, dates, outcomes), relationships (connections such as "participant of" or "leads"), and classifications (hierarchical or categorical types, e.g., "Project," "Skill," "Role").

For example, FIG. 5 illustrates a data structure for an exemplary query, e.g., to obtain data from the user-specific ontology, in accordance with one or more embodiments of this disclosure. In particular, FIG. 5 includes a data structure 500 that includes commands and queries that can be used to interface with the user-specific ontology's graph-based model. These queries can be programmatically constructed by the agentic model subsystem, leveraging metadata and links between relevant classes such as "ex: Project", "ex: participant", and attributes tied to user identity "(here, ex: JaneDoe)".

As illustrated in the exemplary query below, the system initiates retrieval by targeting data fields related to project collaborations, e.g., "("?projectName ", "?role", "?endDate", "?channel")." The agentic model subsystem can pass the generated query, or a pointer to the data in memory, to the ontology access subsystem 166, which can be configured to query the isolated ontology 180 to obtain the relevant data needed to resolve the request. In particular, the ontology access subsystem 166 can obtain the interaction data from the user-specific ontology using the query.

FIG. 6 illustrates exemplary interaction data obtained from a user-specific ontology, e.g., responsive to a query, in accordance with one or more embodiments of this disclosure. The data can include fields for "Project Name", "Role", "End Date", and "Preferred Channel" which are examples of interaction data from an ontology-based query executed by the system. When a request is made to retrieve specific details about a user's project collaborations, the agentic model subsystem can translate this request into a semantic query utilizing the ontology's structured knowledge representation. In some cases, the system can traverse the ontology to identify all projects in which the user participated, and extract the relevant properties such as the name of each project, the user's role within that project, the date each project concluded, and the communication channel most frequently used or preferred for those collaborations. Each record in the resulting output can correspond to a unique project, with semantic elements precisely mapped to human-readable attributes. For example, "Project Atlas" as Lead Developer with an end date of Jun. 30, 2025, via Slack, and "Project Mercury" as Contributor with a completion date of Sep. 15, 2025, using Email, can reflect the structured instances within the user-specific ontology.

The system can then pass the retrieved interaction data from the ontology to the filtering subsystem 168, which is configured to generate a set of filtering operations and further perform the filtering operations to obtain user data without sensitive or unnecessary data. The response generation subsystem can then use the filtered data to obtain a response that can be transmitted via the communication session. In particular, the filtering subsystem 168 can be configured to generate a set of filtering operations, where the set of filtering operations comprises user-set filtering operations for data transmission and the one or more context-based filtering operations.

As described herein, user-set filtering operations can be specified by individual users or organizational administrators and reflect explicit preferences or privacy requirements, ensuring data is only transmitted under controlled and approved conditions. Context-based filtering operations, on the other hand, are automatically invoked by the subsystem in response to the specific attributes and intent of each data request, optimizing relevance and minimizing unnecessary data exposure. These categories can be embodied in several specialized filter types. A temporal filter, for example, can be designed to exclude data generated outside a specified time window, allowing users to restrict results to recent or relevant periods and maintain data freshness. The context-based filter can scope the returned data to only those aspects that directly address the semantics and parameters of the current request, e.g., it can remove records unrelated to the user's active projects or organizational objectives. Similarly, a data resolution filter can further enhance privacy and compliance by masking sensitive metadata, such as detailed timestamps or user identifiers, and instead produce generalized or aggregated data outputs.

Figure 7:
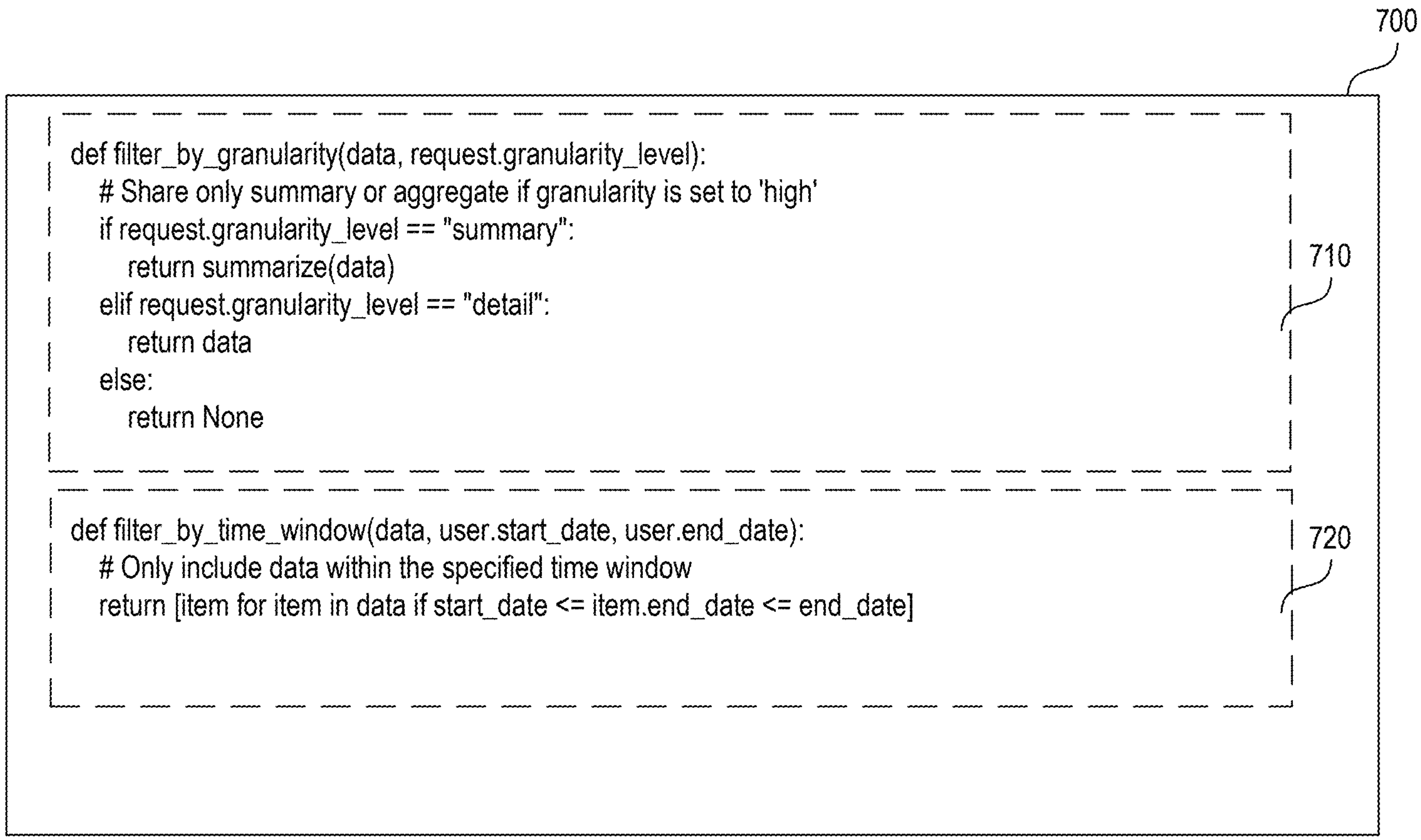
FIG. 7 illustrates a data structure that represents a data structure of including a set of filtering operations, in accordance with one or more embodiments of this disclosure.

For example, FIG. 7 illustrates a data structure that represents one or more filtering operations, including a set of filtering operations 700, in accordance with one or more embodiments of this disclosure. For example, the first function 710, "filter_by_granularity," can determine the level of detail in the information that will be shared in response to a request. If the request specifies a "summary" granularity level, the function invokes a function, e.g., "summarize (data)", which can aggregate or condense the data so that only overarching patterns or statistics are transmitted, thereby protecting sensitive details and minimizing data disclosure. For example, rather than exposing individual transaction details, the "summarize (data)" function might output metrics like total volume, median values, standard deviations, or trend lines over a period.

Alternatively, if "detail" is requested, the complete dataset is returned, such as in use cases where comprehensive information is necessary, such as audits or in-depth analysis. This type of filter is essential in privacy-preserving frameworks or when different audiences require different abstraction levels of organizational knowledge. The second function 720, "filter_by_time_window," can enforce temporal constraints on the dataset by only including items whose "end_date" falls within the range specified by "user.start_date" and "user.end_date." The function can iterate over each item in the data collection and select only those whose timestamps conform to the defined period.

According to some implementations, the system can generate a sequence of filtering operations and can store the operations in the sequence. The sequence can be determined based on filter granularity for example, if early filtering operations reduce the data size for downstream operations, the system can conserve computational resources and speed up performance. In particular, the system can determine an order of filtering operations based on which filtering operation will filter the most data. If the filtering operation has the most conditions, for example, the system can prioritize that filtering operation over others. Filtering operations can output the data in a different format, redact certain portions of the data, or mask sensitive fields to ensure privacy and compliance with data protection requirements. Additionally, these operations can aggregate or anonymize information to further reduce the risk of exposure, presenting only summary statistics or generalized patterns instead of granular details.

Upon applying the filtering operations, the system can pass the output filtered data to the response generation subsystem 170. The response generation subsystem 170 can be configured to generate, such as using the user-specific agentic model, a response to the request with the filtered data. In particular, the response generation subsystem 170 can reformat the data in a format suitable for ingestion at the entity device. This can include transforming the raw or filtered dataset into a structured output (e.g., JSON, XML, or CSV) to ensure that the field types, schema layout, and encoding fully align with the device's integration requirements. The subsystem can normalize and validate values as well, such as by converting date formats or standardizing units, and include any necessary metadata or authentication information to support parsing and secure automated processing. For example, FIG. 8 shows an example of a response. In particular, the response 800 includes formatted data including fields that were needed to fulfill the request. The response in the example of FIG. 8 does not include data such as indicated by "Detailed project outcomes withheld per user preference" which indicates that the outcomes are withheld as a result of the one or more filtering operations.

As described herein, this output data may be transmitted, such as to enable identification of user-aligned and/or high priority tasks such as through negotiation between the agentic models via the communication session. In some implementations, the user-specific agentic model and ontology-based data retrieval system can construct, as the filtered output, a privacy-preserving model of the individual's task preferences, skills, availability, and constraints represented as an ontology projection, which includes a shareable and structured portion of the overall ontology filtered for privacy. On the entity device side, the entity-specific agentic model may model organizational requirements, including task urgency, strategic priorities, resource needs, and preferred skill allocations, and aggregate the relevant data associated with the request as part of an ontology projection and transmit the ontology projection (e.g., as part of the request, or responsive to a request for further data, or alongside the request as a separate data structure).

The user-specific agentic model may communicate, such as through the secure communication session, only the relevant, permissioned elements of its ontology. For example, responsive to a request such as "we got a batch of tasks, please confirm whether the user can be scheduled for the upcoming weekly compliance audit session this Tuesday afternoon, and indicate if they are interested in joining the newly formed analytics working group for upcoming data review projects," the user-specific agentic model may identify ontological elements that reflect that the user is available for compliance tasks on Tuesdays, and prefers analytics assignments and those ontological elements can be sent to the entity-specific agentic model. In order to identify relevant tasks, the agentic models can undergo a negotiation process whereby the entity device can compile a candidate list of tasks that align with the user-specific ontology projection received and the new batch of tasks, for example. The user-specific agentic model can then score these candidate list of tasks according to how well they fit the user's interests, historical performance, and current workload. In some implementations, advanced constraint satisfaction algorithms can be applied to detect any conflicts (e.g., such as competing urgent tasks that exceed available work hours). In case of such conflicts, the user-specific agentic model can generate recommendations for compromises using federated learning recommendations (e.g., accepting one task while delegating another).

As described herein, conflicts can also include conflicts that prohibit users from being assigned a task or deployed certain resources because of compliance with laws, entity requirements, and/or the like. For example, conflicts can prevent an entity from releasing or using certain data (e.g., confidential information) to specific users (e.g., work at prior employer or being tasked on a different project for the same entity as prior work may include sensitive subject matter that should prevent employees from working on a similar project). For example, the entity-specific ontology may include specific elements or classifications for conflicts or that outline or otherwise specify confidential information for the project. Similarly, the user-specific ontology may include elements such as prior employment, prior work history on sensitive tasks, prior access to computational resources such as databases with sensitive information, etc. In one example, if the entity is looking to create a new team of employees, e.g., users, the entity request may relate to identifying conflicts such as between potential candidates of a team. Similarly, the entity can request information such as skills of a user to ensure that skills needed for a task are encompassed by a candidate group of members to be tasked on a project and subsequently deployed resources associated with the project.

In another example, the entity can try and identify whether the user aligns with a specific task or with the goals of the entity, generally, such that the entity can generate tasks to align the user with goals of the entity, identify better tasks for a user, etc. By doing so, the entity can conserve computational resources such as by deploying some of a limited number of computational resources (e.g., GPU, storage, memory) to a different user who is more aligned to a project. In some implementations, the system may periodically check the user-specific and entity-specific ontologies and data to ensure continuous alignment with the task. For example, if a user who is assigned a task is no longer aligns with the task (e.g., their goals differ, their skills differ, the skills needed are different towards the beginning and end of the task, etc.), the entity-specific agentic model may identify the misalignment and remove access or withdrawing deployment of certain computational resources associated with the task or entity. Similarly, if the user no longer aligns with the entity, e.g., because their goals are different from the entity goals or their skills are no longer necessary or relevant to the entity, the user resources may be transferred to other users or back to the entity. According to some implementations, the skills relevant to the entity and/or the goals of the entity can be determined by the entity-specific agentic model based on current projects, based on public facing press releases of the entity, private internal documents of the entity, and/or based on manual input (e.g., of a manager).

In one example, when a user, such as a manager, is looking to staff a team for a software development project, the system may analyze which individuals are likely to work well together, which managers are best suited to lead the team, and which depth or specialty personnel (e.g., developers, quality assurance teams) should be included based on user-specific ontological elements associated with various different users. Upon identifying one or more candidate teams (e.g., each team including a plurality of members), the system can iterate through each candidate team and evaluate further criteria. For example, the system can evaluate whether proposed team members have previously collaborated, and, if so, assess the outcomes of those collaborations to inform future team assembly. The system may also identify roles or skills needed, such as functional programming skills, product management skills, etc. and see which candidate teams include members that as a whole have all skills or a maximal number of skills.

In some implementations, a user device receiving a task assignment or resource deployment as a result can decline a proposed assignment/deployment, such as without providing a reason (e.g., without revealing a personal reason, without revealing the nature of a sensitive prior assignment). For example, the user device can provide, via a UI on the user device, an actionable graphical element that the user can select to accept or decline the proposed assignment/deployment. Upon accepting the assignment, the user device may be automatically provisioned with corresponding resources, such as databases, tools, etc. needed for the task. Alternatively, or additionally, if the user selects to decline, the entity device may automatically remove the user from the candidate teams. In some implementations, the entity device may do so without alerting or storing data about a user's reasons for the decline. In some implementations, the user-specific ontology can contain securely and confidentially the information about the reason(s) for the decline, but may not transmit this data to the entity device and make such data private. According to one implementation, there may be some users/individuals (e.g., a manager) or a unit in the employer's organization (e.g., HR) that will be entitled to some or all of the data storing the reasons for declining projects.

Specifically, federated decision-making in this system is accomplished through multi-agent optimization, where both the user-specific and entity-specific agentic models independently evaluate and score possible task assignments based on factors such as urgency and alignment with the user's interests. To identify the best possible allocation, reinforcement learning and multi-armed bandit algorithms may be used on both sides, allowing the models to iteratively improve their recommendations. After the user-specific agentic model creates and transmits a proposed task allocation plan, the entity-specific agentic model can either accept the plan, suggest changes, or initiate further negotiation until both parties reach agreement. In some implementations, if no agreement is reached after a predetermined number of transmissions, the unresolved matter (e.g., request or task allocation) can be transmitted to a human manager, e.g., at an operator device via communication subsystem 162.

Once consensus is established, the entity-specific agentic model can formally assign the task to the user, and the user-specific agentic model integrates this assignment into the user's personalized workflow. The allocation process can further enhanced by a continuous feedback loop including by incorporating user feedback following each task's acceptance, completion, or rejection to update future recommendations. For privacy, this feedback can be processed locally by the user device whenever possible. In some cases, when feedback is handled by the entity device, the data can be aggregated with differential privacy techniques to prevent exposure of individual user details.

In some implementations, the system can determine that the request cannot be resolved without requisite interaction data that is filtered out when applying the user-set filtering operations. The system can generate a notification with an actionable element for display at the user device, such as a button or an input field. The actionable element, if selected by the user, can enable the requisite interaction data to be used in generating the response. That is, the user can permit an override of one or more filtering operations such that a response can be provided to the entity device. In particular, the system can append the requisite interaction data to the filtered data and input the combined data to the user-specific model to generate a response.

As described herein, the user device 120 can be in communication with data node 110A and data node 110B, such as of a blockchain, which can be used to access immutable functions used in filtering user data or for immutably logging access to the ontology. For example, ontology-based data retrieval system 160 can be in communication (e.g., via network 140) with a data node 110A, through which the system can access a public blockchain. For example, data node 110A can be a public blockchain node of a public blockchain. Data node 110A can store various data, including user data, copies of on-chain programs, and/or other suitable data. Data node 110A can include software, hardware, or a combination of the two. For example, data node 110A can be a physical server or a virtual server that is running on a physical computer system.

Devices such as user device 120 and/or entity device 150 can be associated with a cryptography-based storage application used at the data nodes. A cryptography-based storage application can also include software, hardware, or a combination of the two. For example, each cryptography-based storage application can include software executed on one or multiple devices or can include hardware, such as a physical device. In some cases, the cryptography-based storage application can be software and can be stored in user devices (e.g., client devices such as smartphones, laptops, electronic tablets, etc.), and a user of the cryptography-based storage application can access the cryptography-based storage application on those devices.

Alternatively, or additionally, the cryptography-based storage application can reside on a special device (e.g., a fob) intended for storing the cryptography-based storage application. For example, the device can store private keys in a memory of the device and allow transactions to be signed (e.g., via generating a cryptographic signature) on the device itself. Examples of cryptography-based storage applications can include cryptographic wallets. For example, a cryptography-based storage application can be referred to as a digital wallet (e.g., hot wallet, cold wallet, etc.). As described herein, some examples of hardware cryptographic wallets include Ledger® and Trezor®. Software cryptographic wallets can include Metamask® and others.

As described herein, a user device 120 can enable users to set preferences for sharing or accessing data managed by the ontology-based data retrieval system 160. In some implementations, a user interacting with the system can be presented with a user interface that allows for the input of specific filtering criteria, such as opting to disclose only certain categories of data to particular third parties, restricting data transmission based upon context or requesting additional layers of anonymization, etc. Once the user device obtains user inputs, the system can generate, using the one or more user inputs, at least one user-set filtering operation. In particular, these preferences can be used to generate one or more user-set filtering operations, representing executable logic that defines how the user's data should be selected or redacted prior to transmission or processing by other components within the environment.

According to some implementations, these filtering operations can be stored within an on-chain program, e.g., a blockchain-based smart contract. The user device 120 generates and transmits an operation for deploying the on-chain program containing the filtering operations, via the network 140, to a designated blockchain node, such as data node 110A or data node 110B. The on-chain program, when deployed, serves as an immutable, distributed registry that stores the user's data sharing parameters. In particular, the on-chain program can be deployed by transmitting the relevant on-chain program code to the blockchain node, which then validates and records the contract on the blockchain. This approach ensures that user-defined data access preferences are permanently and transparently encoded, with integrity protected by the underlying cryptography of the chain.

Thereafter, the user device 120 at a later time can access the stored filtering operations by initiating a function call to the on-chain program. For example, when data transmission is requested, the system queries the on-chain program via the blockchain node, retrieving the exact parameters set by the user. The blockchain's nature as an immutable ledger ensures that any invocation, modification, or access to these parameters is recorded as a transaction, providing a reliable audit trail that cannot be altered retroactively. Importantly, this process allows both real-time enforcement of user privacy preferences and post hoc review or auditing of data access events.

Furthermore, every read or write operation relating to the ontology or associated filtering functions can be immutably logged on-chain. Each time a component within the environment, such as the ontology-based data retrieval system, accesses user data or invokes a filtering operation, a corresponding log entry is written to the blockchain, referencing the relevant transaction and associated metadata (e.g., timestamps, cryptographic identifiers, entities involved).

Figure 9:
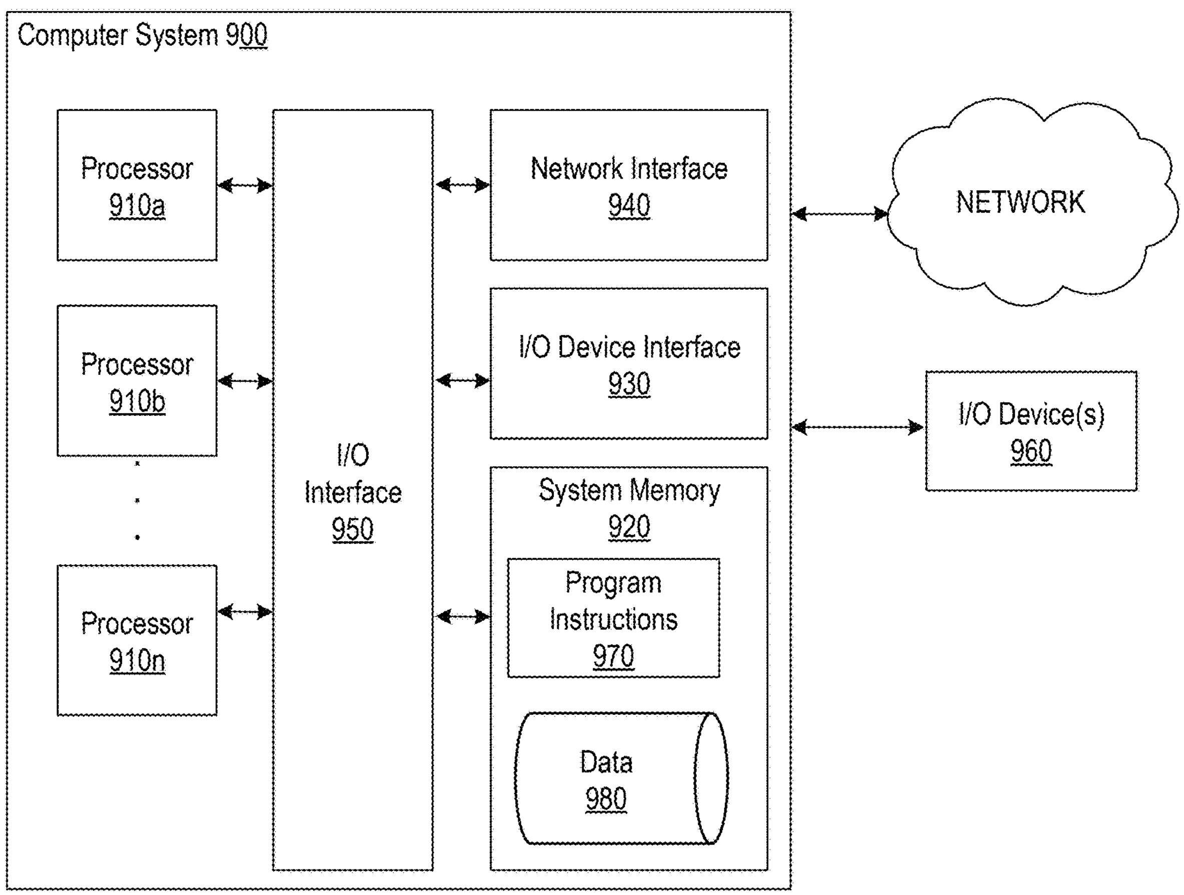
FIG. 9 illustrates a computing system that can be used for secure data retrieval and transmittal, in accordance with one or more embodiments of this disclosure.

FIG. 9 shows an example computing system that can be used in accordance with some embodiments of this disclosure. In some instances, computing system 900 is referred to as a computer system 900. A person skilled in the art would understand that those terms can be used interchangeably. The components of FIG. 9 can be used to perform some or all operations discussed in relation to FIGS. 1-8. Furthermore, various portions of the systems and methods described herein can include or be executed on one or more computer systems similar to computing system 900. Further, processes and modules described herein can be executed by one or more processing systems similar to that of computing system 900.

Computing system 900 can include one or more processors (e.g., processors 910a-910n) coupled to system memory 920, an input/output (I/O) device interface 930, and a network interface 940 via an I/O interface 950. A processor can include a single processor or a plurality of processors (e.g., distributed processors). A processor can be any suitable processor capable of executing or otherwise performing instructions. A processor can include a central processing unit (CPU) that carries out program instructions to perform the arithmetical, logical, and I/O operations of computing system 900. A processor can execute code (e.g., processor firmware, a protocol stack, a database management system, an operating system, or a combination thereof) that creates an execution environment for program instructions.

A processor can include a programmable processor. A processor can include general or special-purpose microprocessors. A processor can receive instructions and data from a memory (e.g., system memory 920). Computing system 900 can be a uni-processor system including one processor (e.g., processor 910a) or a multiprocessor system including any number of suitable processors (e.g., 910a-910n). Multiple processors can be employed to provide for parallel or sequential execution of one or more portions of the techniques described herein. Processes, such as logic flows, described herein can be performed by one or more programmable processors executing one or more computer programs to perform functions by operating on input data and generating corresponding output. Processes described herein can be performed by, and apparatus can also be implemented as special-purpose logic circuitry, e.g., an FPGA (field-programmable gate array) or an ASIC (application-specific integrated circuit). Computing system 900 can include a plurality of computing devices (e.g., distributed computer systems) to implement various processing functions.

I/O device interface 930 can provide an interface for connection of one or more I/O devices 960 to computer system 900. I/O devices can include devices that receive input (e.g., from a user) or output information (e.g., to a user). I/O devices 960 can include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 960 can be connected to computer system 900 through a wired or wireless connection. I/O devices 960 can be connected to computer system 900 from a remote location. I/O devices 960 located on remote computer systems, for example, can be connected to computer system 900 via a network and network interface 940.

The I/O device interface 930 and I/O devices 960 can be used to enable manipulation of the three-dimensional model as well. For example, the user can be able to use I/O devices such as a keyboard and touchpad to indicate specific selections for nodes, adjust values for nodes, select from the history of machine learning models, select specific inputs or outputs, and/or the like. Alternatively, or additionally, the user can use their voice to indicate specific nodes, specific models, and/or the like via the voice recognition device and/or microphones.

Network interface 940 can include a network adapter that provides for connection of computer system 900 to a network. Network interface 940 can facilitate data exchange between computer system 900 and other devices connected to the network. Network interface 940 can support wired or wireless communication. The network can include an electronic communication network, such as the internet, a LAN, a WAN, a cellular communications network, or the like.

System memory 920 can be configured to store program instructions 970 or data 980. Program instructions 970 can be executable by a processor (e.g., one or more of processors 910a-910n) to implement one or more embodiments of the present techniques. Program instructions 970 can include modules of computer program instructions for implementing one or more techniques described herein with regard to various processing modules. Program instructions can include a computer program (which in certain forms is known as a program, software, software application, script, or code). A computer program can be written in a programming language, including compiled or interpreted languages, or declarative or procedural languages. A computer program can include a unit suitable for use in a computing environment, including as a stand-alone program, a module, a component, or a subroutine. A computer program can or can not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one or more computer processors located locally at one site or distributed across multiple remote sites and interconnected by a communication network.

System memory 920 can include a tangible program carrier having program instructions stored thereon. A tangible program carrier can include a non-transitory, computer-readable storage medium. A non-transitory, computer-readable storage medium can include a machine-readable storage device, a machine-readable storage substrate, a memory device, or any combination thereof. A non-transitory, computer-readable storage medium can include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 920 can include a non-transitory, computer-readable storage medium that can have program instructions stored thereon that are executable by a computer processor (e.g., one or more of processors 910*a*-910*n*) to cause the subject matter and the functional operations described herein. A memory (e.g., system memory 920) can include a single memory device and/or a plurality of memory devices (e.g., distributed memory devices).

I/O interface 950 can be configured to coordinate I/O traffic between processors 910*a*-910*n*, system memory 920, network interface 940, I/O devices 960, and/or other peripheral devices. I/O interface 950 can perform protocol, timing, or other data transformations to convert data signals from one component (e.g., system memory 920) into a format suitable for use by another component (e.g., processors 910*a*-910*n*). I/O interface 950 can include support for devices attached through various types of peripheral buses, such as a variant of the Peripheral Component Interconnect (PCI) bus standard or the Universal Serial Bus (USB) standard.

Embodiments of the techniques described herein can be implemented using a single instance of computer system 900 or multiple computer systems 900 configured to host different portions or instances of embodiments. Multiple computer systems 900 can provide for parallel or sequential processing/execution of one or more portions of the techniques described herein.

Those skilled in the art will appreciate that computer system 900 is merely illustrative and is not intended to limit the scope of the techniques described herein. Computer system 900 can include any combination of devices or software that can perform or otherwise provide for the performance of the techniques described herein. For example, computer system 900 can include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 900 can also be connected to other devices that are not illustrated or can operate as a stand-alone system. In addition, the functionality provided by the illustrated components can, in some embodiments, be combined in fewer components or be distributed in additional components. Similarly, in some embodiments, the functionality of some of the illustrated components can not be provided, or other additional functionality can be available.

Figure 10:
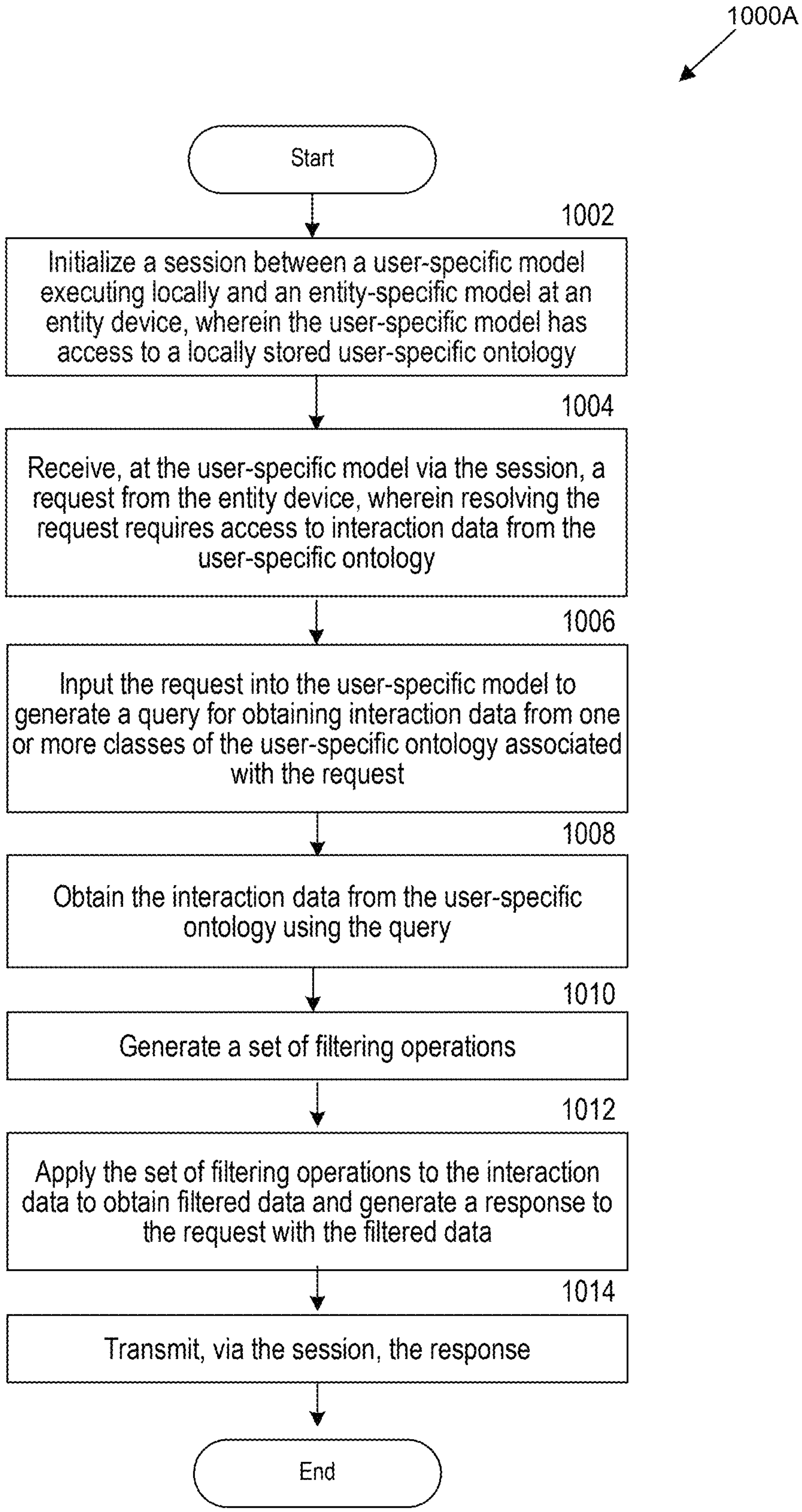
FIG. 10 is a flowchart of operations for secure data retrieval and transmittal using isolated ontologies, in accordance with one or more embodiments of this disclosure.

FIG. 10 is a flowchart 1000 of operations for secure data-retrieval using isolated ontologies, in accordance with one or more embodiments of this disclosure. The operations of FIG. 10 can use components described in relation to FIG. 9. In some embodiments, ontology-based data retrieval system 160 can include one or more components of computer system 900. At operation 1002, one or more of processors 910*a*-910*n* can be used to initialize a session between a user-specific model executing locally and an entity-specific model at an entity device, wherein the user-specific model has access to a locally stored user-specific ontology. One or more of processors 910*a*-910*n* can initialize the communication session over communication network 140 using network interface 940.

At operation 1004, one or more of processors 910*a*-910*n* can receive, at the user-specific model via the session, a request from the entity device, wherein resolving the request requires access to interaction data from the user-specific ontology. At operation 1006, one or more of processors 910*a*-910*n* can input the request into the user-specific model to generate a query for obtaining interaction data from one or more classes of the user-specific ontology associated with the request. At operation 1008, one or more of processors 910*a*-910*n* can obtain the interaction data from the user-specific ontology using the query. At operation 1010, one or more of processors 910*a*-910*n* can generate a set of filtering operations. At operation 1012, one or more of processors 910*a*-910*n* can apply the set of filtering operations to the interaction data to obtain filtered data and generate a response to the request with the filtered data. At operation 1014, one or more of processors 910*a*-910*n* can transmit, via the session (e.g., communication session), the response.

Figure 11:
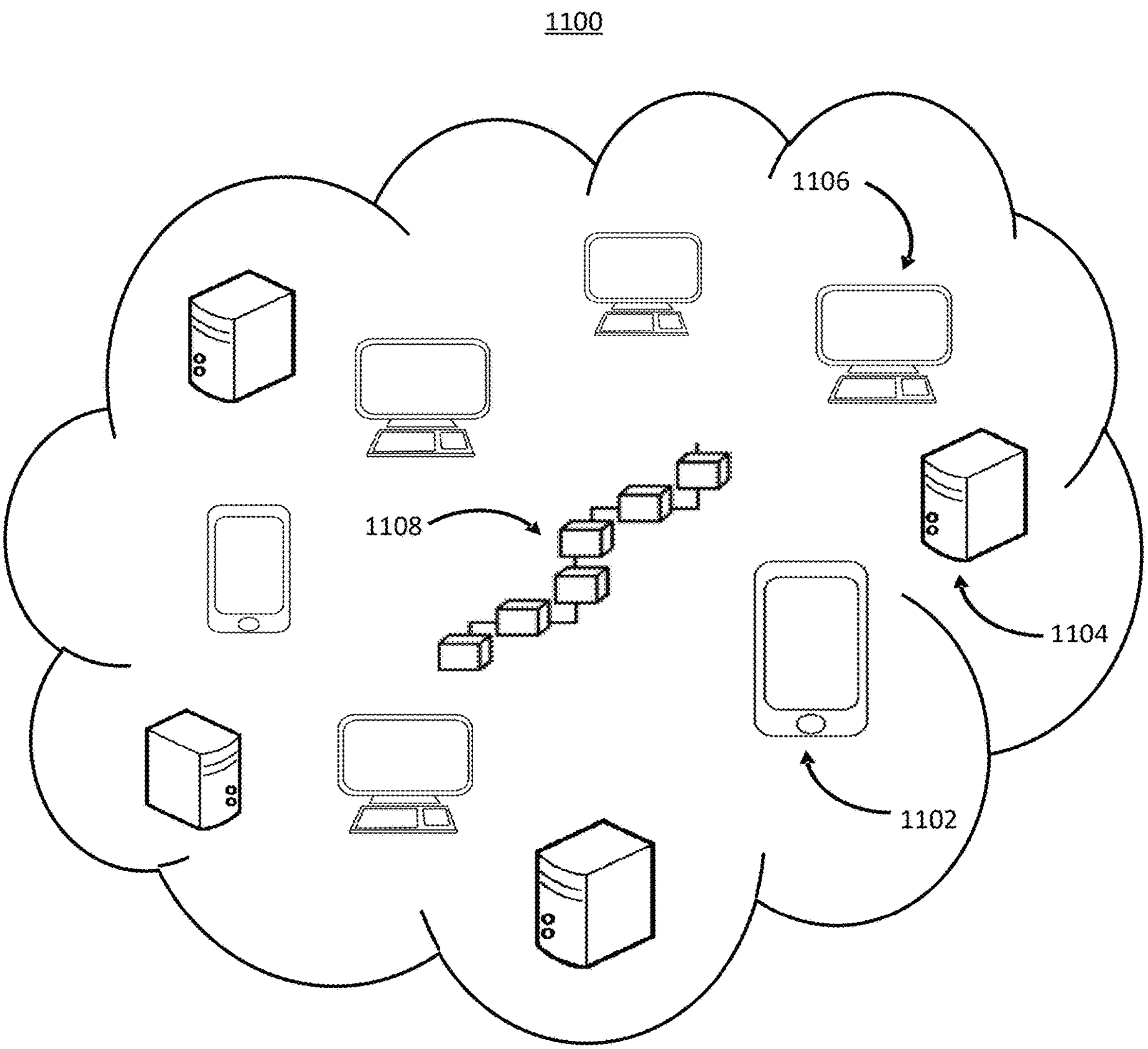
FIG. 11 shows an illustrative diagram for a decentralized environment for performing blockchain functions (sometimes referred to as blockchain operations), in accordance with one or more embodiments.

FIG. 11 shows an illustrative diagram for a decentralized environment for performing blockchain functions (sometimes referred to as blockchain operations), in accordance with one or more embodiments. For example, the diagram presents various components that can be used for transferring control of vehicle information to other users using NFTs in some embodiments.

As shown in FIG. 11, system 1100 can include multiple user devices (e.g., user device 1102, user device 1104, and/or user device 1106). For example, system 1100 can comprise a distributed state machine in which each of the components in FIG. 11 acts as a client of system 1100. For example, system 1100 (as well as other systems described herein) can comprise a large data structure that holds not only all accounts and balances but also a state machine, which can change from block to block according to a predefined set of rules and which can execute arbitrary machine code. The specific rules of changing state from block to block can be maintained by a virtual machine (e.g., a computer file implemented on and/or accessible by a user device, which behaves like an actual computer) for the system. For example, system 1100 can interact with, and facilitate the function of, blockchain 1108.

It should be noted that while shown as a smartphone, a personal computer, and a server in FIG. 11, the user devices can be any type of computing device, including, but not limited to, a laptop computer, a tablet computer, a handheld computer, and/or other computing equipment (e.g., a server), including "smart," wireless, wearable, and/or mobile devices. It should be noted that embodiments describing the system 1100 performing a blockchain function can equally be applied to, and correspond to, an individual user device (e.g., user device 1102, user device 1104, and/or user device 1106) performing the blockchain function. That is, system

1100 can correspond to the user devices (e.g., user device 1102, user device 1104, and/or user device 1106) collectively or individually.

Each of the user devices can be used by the system to conduct blockchain functions. As referred to herein, "blockchain functions" can comprise any operations including and/or related to blockchains and blockchain technology. For example, blockchain functions can include conducting transactions, querying a distributed ledger, generating additional blocks for a blockchain, transmitting communications-related NFTs, performing encryption/decryption, exchanging public/private keys, and/or other operations related to blockchains and blockchain technology. In some embodiments, a blockchain function can comprise the creation, modification, detection, and/or execution of a smart contract or program stored on a blockchain. For example, a smart contract can comprise a program stored on a blockchain that is executed (e.g., automatically, without any intermediary's involvement or time loss) when one or more predetermined conditions are met. In some embodiments, a blockchain function can comprise the creation, modification, exchange, and/or review of a token (e.g., a digital blockchain-specific asset), including an NFT. An NFT can comprise a token that is associated with a good, a service, a smart contract, and/or other content that can be verified by, and stored using, blockchain technology.

In some embodiments, blockchain functions can also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function can include an amount of gas that sets the upper limit of what can be consumed in running the smart contract. The system can terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function can consume.

In some embodiments, gas can be obtained as part of a blockchain function (e.g., a purchase) using a network-specific cryptocurrency (e.g., ether in the case of Ethereum). The system can require gas (or the amount of the network-specific cryptocurrency corresponding to the required amount of gas) to be transmitted with the blockchain function as an earmark to the blockchain function. In some embodiments, gas that is earmarked for a blockchain function can be refunded back to the originator of the blockchain function if, after the computation is executed, an amount remains unused.

As shown in FIG. 11, one or more user devices can include a digital wallet (e.g., digital wallet associated with user device 1104) used to perform blockchain functions. A digital wallet can be referred to as a cryptography-based storage application. For example, the digital wallet can comprise a repository that allows users to store, manage, and trade their cryptocurrencies and assets, interact with blockchains, and/or conduct blockchain functions using one or more applications. The digital wallet can be specific to a given blockchain protocol or can provide access to multiple blockchain protocols. In some embodiments, the system can use various types of wallets, such as hot wallets and cold wallets. Hot wallets are connected to the Internet, while cold wallets are not. Most digital wallet holders hold both a hot wallet and a cold wallet. Hot wallets are most often used to perform blockchain functions, while a cold wallet is generally used for managing a user account and can have no connection to the Internet.

As shown in FIG. 11, one or more user devices can include a private key and/or digital signature. Digital signature can sometimes be referred to as cryptographic signature. For example, system 1100 can use cryptographic systems for conducting blockchain functions. For example, system 1100 can use public key cryptography, which features a pair of digital keys (e.g., which can comprise strings of data). In such cases, each pair comprises a public key (e.g., which can be public) and a private key (e.g., which can be kept private). System 1100 can generate the key pairs using cryptographic algorithms (e.g., featuring one-way functions). System 1100 can then encrypt a message (or other blockchain function) using an intended receiver's public key such that the encrypted message can be decrypted only with the receiver's corresponding private key. In some embodiments, system 1100 can combine a message with a private key to create a digital signature on the message. For example, the digital signature can be used to verify the authenticity of blockchain functions. As an illustration, when conducting blockchain functions, system 1100 can use the digital signature to prove to every node in the system that it is authorized to conduct the blockchain functions.

For example, system 1100 can comprise a plurality of nodes for the blockchain network. Each node can correspond to a user device (e.g., user device 1102). A node for a blockchain network can comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes can continually record the state of the blockchain and respond to remote procedure requests for information about the blockchain.

For example, user device 1102 can request a blockchain function (e.g., conduct a transaction). The blockchain function can be authenticated by user device 1104 and/or another node (e.g., a user device in the community network of system 1100). For example, using cryptographic keys, system 1100 can identify users and give access to their respective user accounts (e.g., corresponding digital wallets) within system 1100. Using private keys (e.g., known only to the respective users) and public keys (e.g., known to the community network), system 1100 can create digital signatures to authenticate the users.

Following an authentication of the blockchain function, the blockchain function can be authorized. For example, after the blockchain function is authenticated between the users, system 1100 can authorize the blockchain function prior to adding it to the blockchain. System 1100 can add the blockchain function to blockchain 1108. System 1100 can perform this based on a consensus of the user devices within system 1100. For example, system 1100 can rely on a majority (or other metric) of the nodes in the community network (e.g., user device 1102, user device 1104, and/or user device 1106) to determine that the blockchain function is valid. In response to validation of the block, a node user device (e.g., user device 1102, user device 1104, and/or user device 1106) in the community network (e.g., a miner) can receive a reward (e.g., in a given cryptocurrency) as an incentive for validating the block.

To validate the blockchain function, system 1100 can use one or more validation protocols and/or validation (or consensus) mechanisms. For example, system 1100 can use a Proof of Work ("POW") mechanism in which a user device must provide evidence that it performed computational work to validate a blockchain function, and thus, this mechanism provides a manner for achieving consensus in a decentralized manner, as well as preventing fraudulent validations. For example, the POW can involve iterations of a hashing algorithm. The user device that is successful aggregates and records blockchain functions from a mempool (e.g., a collection of all valid blockchain functions waiting to be confirmed by the blockchain network) into the next block. Alternatively, or additionally, system 1100 can use a Proof of Stake ("POS") mechanism in which a user account (e.g., corresponding to a node on the blockchain network) is required to have, or "stake," a predetermined amount of tokens in order for system 1100 to recognize it as a validator in the blockchain network.

Figure 12A:
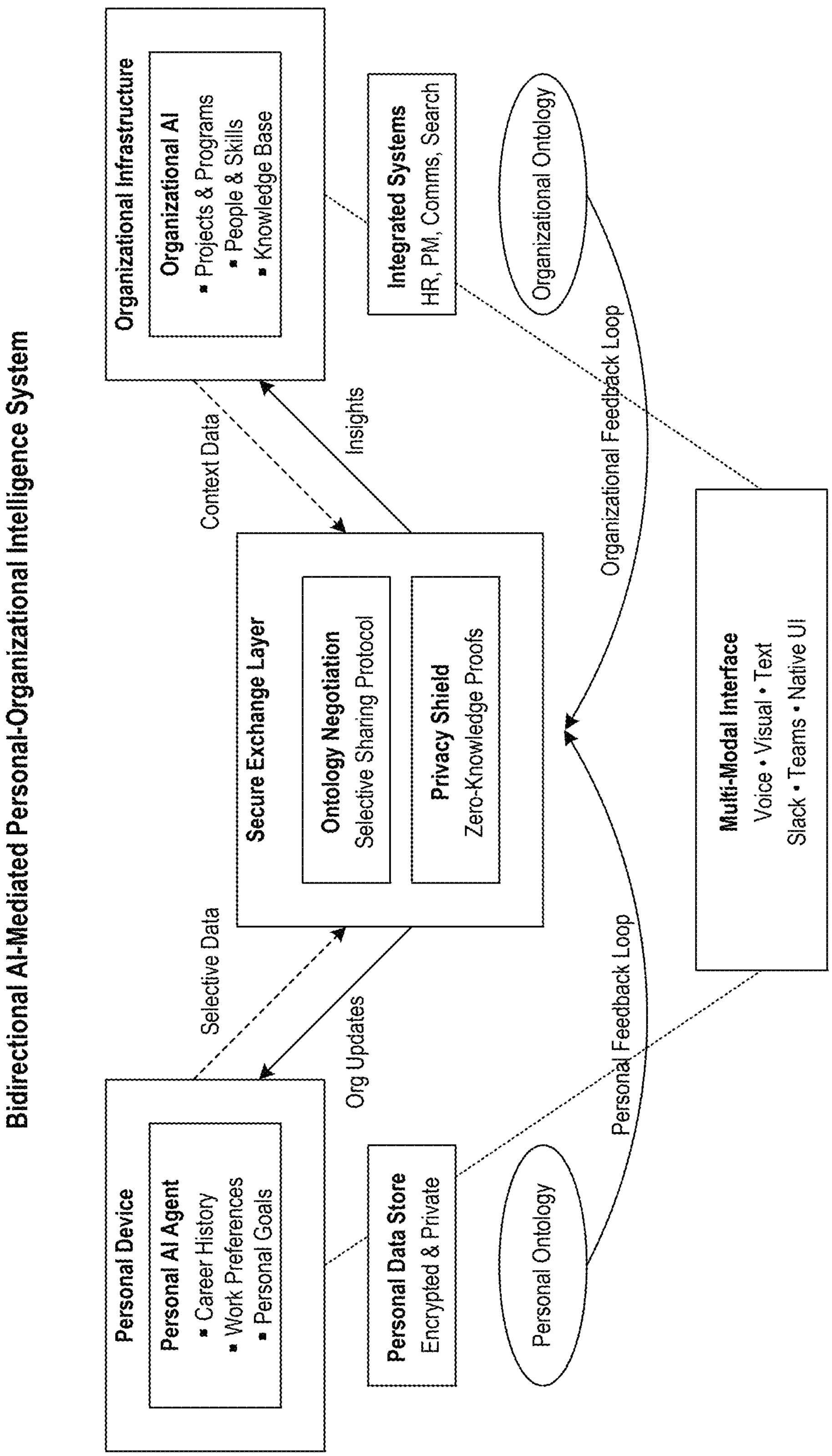
FIG. 12A shows an illustrative environment for secure data retrieval and transmittal with a bidirectional architecture, in accordance with one or more embodiments of this disclosure.

FIG. 12A-G each shows specific embodiments of the disclosed system. For example, FIG. 12A shows an illustrative environment for secure data retrieval and transmittal with a bidirectional architecture, in accordance with one or more embodiments of this disclosure. The environment includes a personal device, which can include, for example, the user device 120. The personal AI agent, e.g., user-specific agentic model, can be trained using the user's career history, work preferences, personal goals, and/or the like. As described herein, the personal AI agent can have access to the personal ontology (e.g., user-specific ontology) of the user. In the example of FIG. 12A, the personal ontology is stored remotely.

The environment of FIG. 12A also includes a personal data store. As described herein, the personal data store can store and manage the user-specific data, whereas the ontology can comprise a framework that includes definitions and relationships of the constituent components of the data. The personal device can be communicatively coupled to the organizational infrastructure (e.g., entity system or device) via a secure exchange layer. For example, the organizational infrastructure can include at least one device having entity-specific model, such as the depicted organizational AI. The organizational AI can be trained on and have access to data relating to the projects and programs of the entity (e.g., organization), data on the members (e.g., people) of the entity and their corresponding skills, as well as a knowledge base. According to some implementations, the organizational infrastructure can be integrated with other systems, such as for management of communications, etc.

In the example of FIG. 12A, the organizational ontology (e.g., entity-specific) is remotely stored from the organizational infrastructure. The organizational ontology can store relationships and definitions corresponding to the data obtained from the integrated systems, and/or the knowledge base of the organizational infrastructure. As described herein, the organizational ontology and personal device can be in communication, such as through multi-modal interface, as depicted in FIG. 12A. Sensitive data can be transmitted through the secure exchange layer, which can perform ontology negotiation through which the layer can receive data from both ontologies and resolve terminological and semantic differences. In order to maintain security and privacy against bad actors, the data that is transmitted can be shielded, e.g., through a privacy shield, by using zero-knowledge proofs to validate the data.

The personal device can pass selective data (e.g., the filtered data) to the secure exchange layer (e.g., the secure communication session). Similarly, the device(s) of the organizational infrastructure can pass data, such as contextual data relating to the system via the secure exchange layer. The secure exchange layer can pass insights obtained from the selective data of the user onto the organizational infrastructure. Similarly, the secure exchange layer can pass organizational updates onto the personal device, from, e.g., an entity device. Both the personal ontology and the organizational ontology can transmit data to the secure exchange layer, e.g., to implement a feedback loop, e.g., "personal feedback loop" and "organizational feedback loop."

For example, in certain embodiments, the disclosed secure data retrieval system (and corresponding system within the entity device) can employ reinforcement learning techniques to continually improve the performance and personalization capabilities of user-specific and entity-specific agentic models operating within isolated ontologies. Through the use of multi-armed bandit algorithms, the system can dynamically optimize recommendation outputs, e.g., such as project assignments, opportunity alerts, or skill development recommendations, by adaptively exploring and exploiting action choices based on contextual feedback stored in the user-specific ontology. For example, each user-device can maintain local logs of outcomes and preferences, allowing the agentic model to learn which recommendation strategies yield the highest engagement or satisfaction under privacy constraints.

The system can further integrate conflict detection mechanisms using constraint satisfaction algorithms, which scan both personal and entity-specific ontologies for potential inconsistencies or resource clashes (e.g., scheduling or goal misalignments) before propagating recommendations or action plans. In the event that goal alignment between user and organizational objectives becomes non-trivial, automated negotiation protocols are instantiated at the protocol layer, permitting privacy-preserving semantic exchanges of position, preference, and feasibility via secure communication sessions, thereby enabling negotiated resolutions without exposing extraneous user data. The system also conducts continuous A/B testing of candidate operational pathways, e.g., such as filtering sequences, data redaction policies, and user interface variations, on live queries and interactions, ensuring that every update to the personalization logic, filtering operations, and access pathways leads to measurable improvements in relevance, privacy, and latency.

As described herein, conflicts can also include conflicts that prohibit users from being assigned a task or deployed certain resources because of compliance with laws, entity requirements, and/or the like. In particular, conflicts can include limitations or prohibitions against release/use of confidential information (e.g., government work in sensitive arenas, work at prior employer may include sensitive subject matter that should prevent employee from working on a similar project at the new employer) and non-compete provisions (e.g., time limited, geographical, terms of limitations). According to some implementations, the user may be a different, second entity having its own entity-specific ontology. The second entity-specific ontology and agentic model associated with it can be used to check conflicts, e.g., to see if the second entity can take on various tasks, access certain data, or be deployed certain computational resources (e.g., private data, storage, memory, GPUs, etc.) from the first entity.

For example, entities such as law firms, consultants, and accounting firms utilize a tremendous amount of computational resources to perform conflict checks prior to undertaking new work. Furthermore, many conflicts checks are done using communications over unsecured sessions such as emails. Techniques disclosed herein would allow such processes to occur seamlessly, automatically, and in real time without requiring intervention or review by individuals such as attorneys. In particular, techniques disclosed herein further enable entities such as law firms, consultants, and accounting firms to assemble quickly and efficiently teams to staff projects and/or adjust staffing based on changing circumstances in a manner that improves the operation of the entity and also the individual teams.

In some implementations, the system can mediate and surface to human managers instances where there are significant tradeoffs related to staffing decisions. Conventional systems rely on manual oversight by practice management leadership and internal skills databases that merely provide limited information about where in the organization skills reside. Thus, an important innovation is the ability to coordinate the use of multiple individual private ontologies with the strategic and operational needs of the organization (e.g., as expressed in its ontology). The disclosed system can be used by an organization to identify a misalignment of skills to existing (and likely future) projects at the level of individual(s), teams, lines of business, and the overall enterprise, as described herein.

Figure 12B:
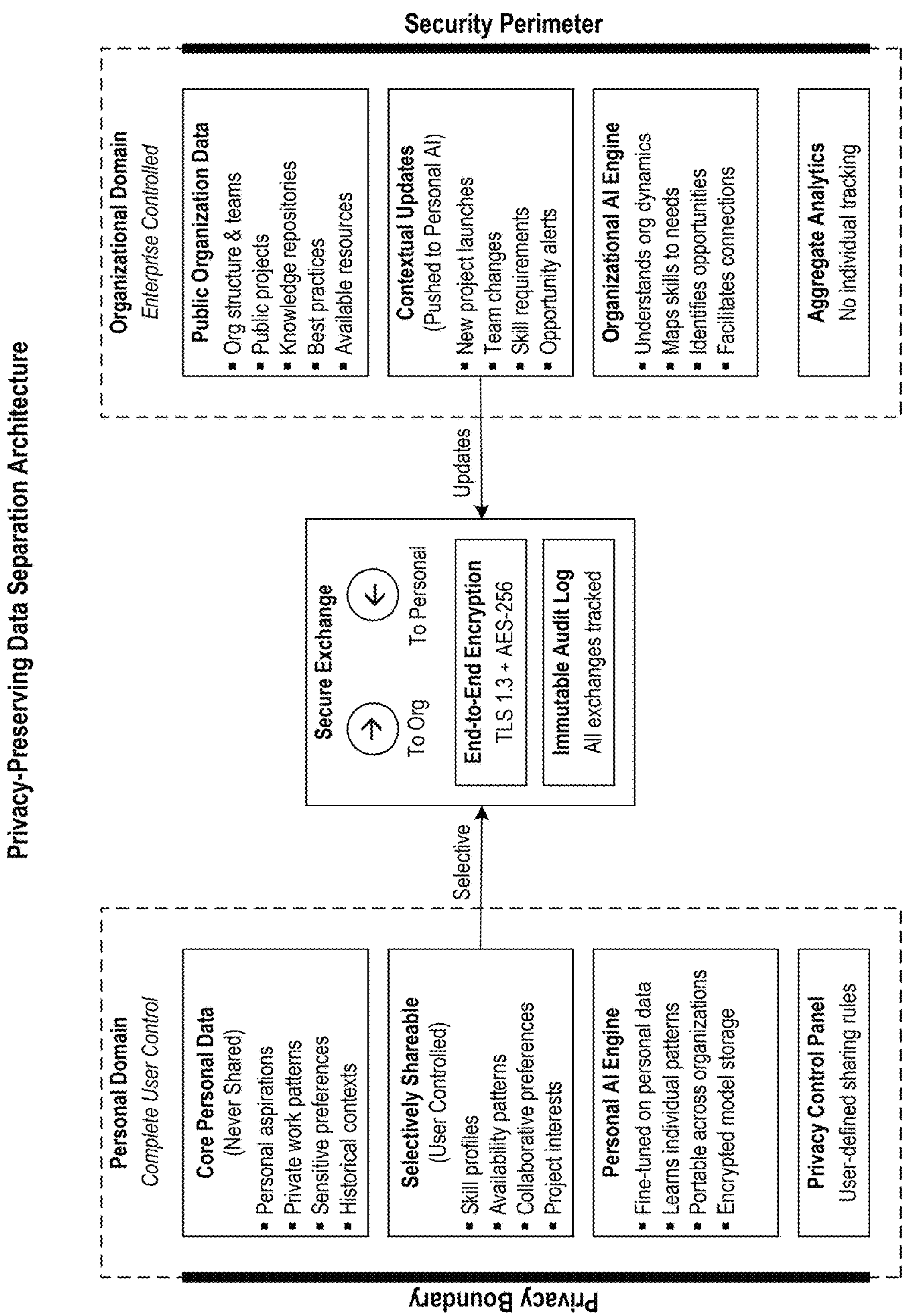
FIG. 12B shows an illustrative privacy-preserving data separation architecture, in accordance with one or more embodiments of this disclosure.

FIG. 12B shows an illustrative privacy-preserving data separation architecture, in accordance with one or more embodiments of this disclosure. For example, the user-specific data "personal domain" can include various groups of data that can be stored locally, remotely, and/or a combination of locally and remotely on the personal device (e.g., the user device). For example, the personal domain can include core personal data which can never be shared with the organization (e.g., entity device). For example, core personal data can include personal aspirations, private work patterns, sensitive preferences, and/or historical context (e.g., historical data relating to the user). The personal domain can also include data that is selectively shareable, such as based on the user's set preferences (e.g., input via the user device). For example, the selectively shareable data can include skills profiles, availability patterns, collaboration preferences, and/or project interests. The personal domain can further include the personal AI (e.g., user-specific agentic model) which can be fine-tuned across personal data, learn individual patterns specific to the user, and is portable across different organizations. Furthermore, as described herein, the model parameters can be encrypted such that the parameters cannot be modified by others, e.g., including bad actors and the entity.

The personal domain can further include a privacy control panel storing the user's preference for sharing various data. The user device, having access to the personal domain, can identify relevant information, filter based on user-set preferences and contextual cues, and transmit the output via the secure exchange. As described herein, the secure exchange (e.g., the secure communication session) can utilize end-to-end encryption and can further trigger, upon receiving or transmitting data, an entry to be added to an immutable audit log that can be reviewed by the user or entity device at a future time. As shown in the example of FIG. 12B, the data of the personal domain can be prevented from being accessed except within the personal domain, by the user device, and through the secure exchange layer, as is illustrated by the privacy boundary. For example, the privacy boundary can prevent access by other devices or users.

According to some implementations, the entity-specific ontology can be partitioned, such as by access layer. In particular, users associated with the user devices may have various access permissions, which can be stored as part of the user's ontology or profile. The user device may be enabled to access the elements or groupings of the entity ontology that correspond to a partition accessible to those with a same access permission as the user. The user device may further periodically or continuously stream updates to the partition of the entity-specific ontology to the user-specific ontology. For example, senior management may have access to ontological elements relating to sensitive strategies for the entity, but should not let subject matter experts, team members and leaders, etc. have access to the same information. In this example, a first partition may include all elements of the ontology and the access permissions corresponding to the partition can enable users having the highest permissions, e.g., senior management, to access the data of the first partition. A second partition can include a subset of the ontological elements, such as corresponding to a class of elements relating to "legal contracts." The second partition may have access permissions that enable only legal professionals staffed on the contracts review task to access the data. Thus, key sensitive information relating to management can be prevented from leaking into the hands of individuals at all levels in the organization and/or do not have a need to know.

The organization's data can be stored at one or more devices (e.g., locally, remotely, or a combination) as an organizational domain. The organizational domain can include public organizational data, such as the structure and teams making up the organization, public projects, knowledge repositories, best practices, and/or available resources. According to some implementations, the user device can access the organizational data that is public, such as via an API. In one implementation, other devices, including those of other entities, can also be enabled to access the public data. The organizational domain can further include contextual updates, which can be pushed to the personal domain (e.g., via the secure exchange). For example, the contextual updates can include data such as new project launches (e.g., when a new project is entered into the entity system via an entity device, the entity device can push the data), team changes, skill requirements, and/or opportunity alerts (e.g., new job positions, etc.).

The organizational domain can further include the organizational AI engine (e.g., entity-specific agentic model) which is configured to understand dynamics of the organization (e.g., entity), map skills to needs, identify opportunities and facilitate connections. For example, according to some implementations, when the public organization data is updated, e.g., via a batch of contextual updates, the contextual updates can be provided to the organizational AI engine. The organizational AI engine, based on the data it has and based on the changes, can identify one or more different action items or pushes that are relevant, e.g., to the user. The entity device can then push the action items to the user device. The organizational domain can further include aggregate analytics which do not include data that is user-identifying, but rather stores data relating to many users of the entities. As shown in the example of FIG. 12B, the data of the organizational domain can be prevented from being accessed except within the organizational domain, by a device associated with or authorized by the entity, and through the secure exchange layer, as is illustrated by the security perimeter. For example, the security perimeter can prevent access by other devices or entities.

Figure 12C:
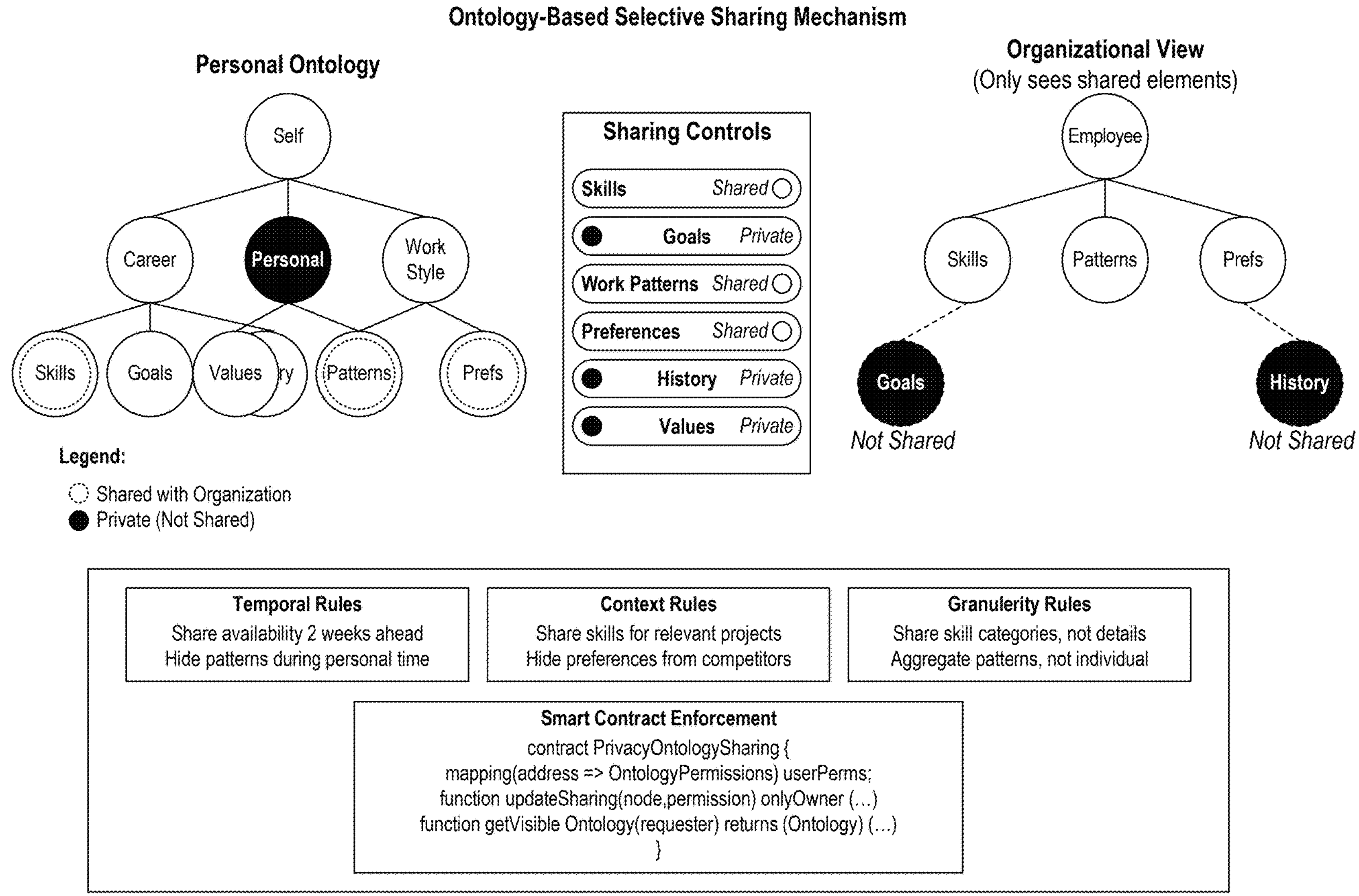
FIG. 12C shows an illustrative ontology-based selective sharing mechanism, in accordance with one or more embodiments of this disclosure.

FIG. 12C shows an illustrative ontology-based selective sharing mechanism, in accordance with one or more embodiments of this disclosure. As described herein, the personal ontology can store relationships and data specific to the user, which includes data that can be shared with the entity as well as data that the user does not desire to be shared with the entity. For example, in FIG. 12C, the user skills, preferences, and patterns are data that can be shared externally to the user, whereas personal data is not to be shared externally to the user. The sharing controls illustrates, for example, a user interface indicative of a user selection for various sharing preferences. As can be seen in the example of FIG. 12C, the user selects to share data relating to their skills, work patterns and preferences. Thus, this data can be shared, e.g., via the secure exchange with the entity (e.g., organization). Thus, the organization can view only this data relating to the user and can store, in its own ontology, the data relating to the user that is shared.

Figure 12D:
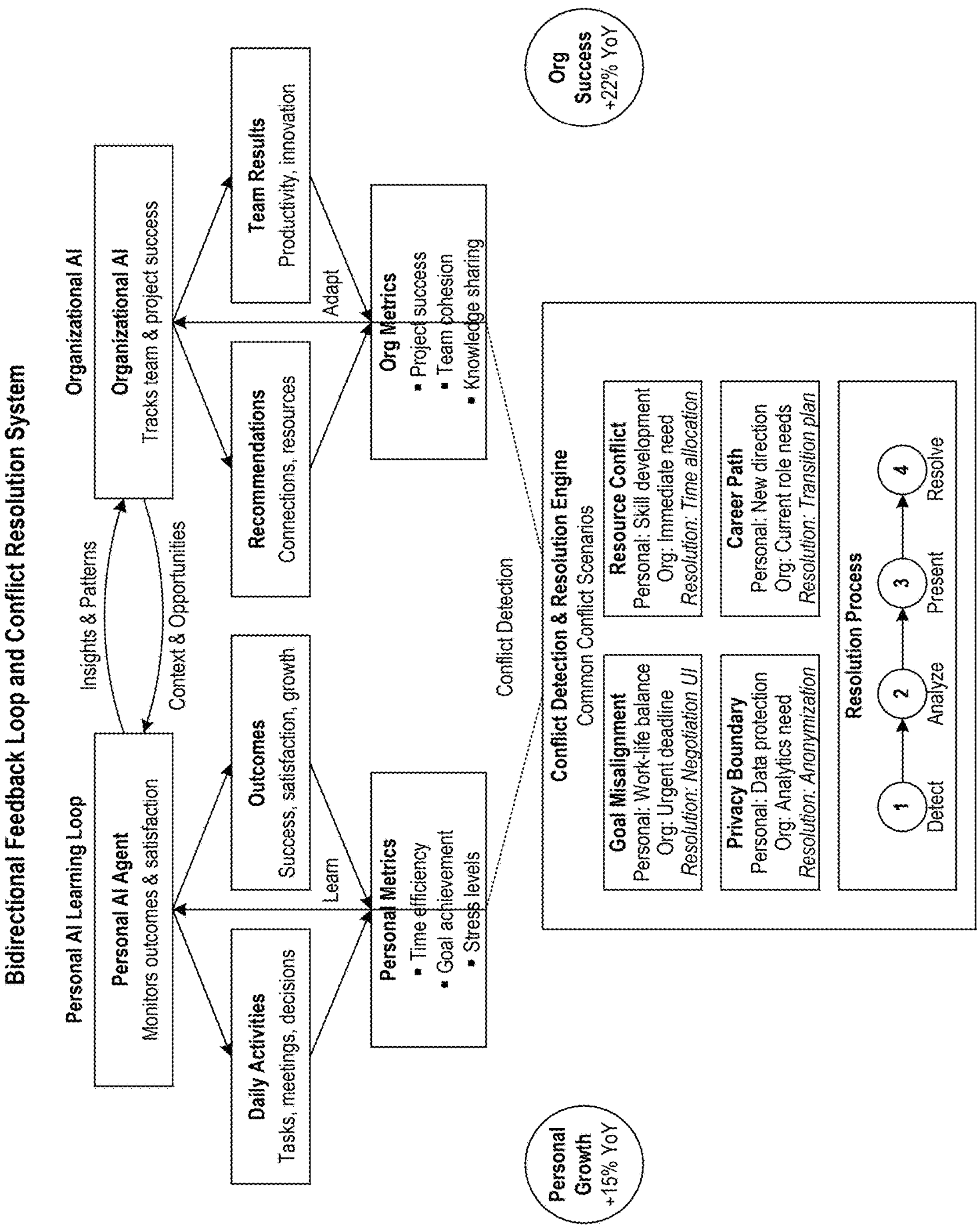
FIG. 12D shows an illustrative feedback loop and conflict resolution system, in accordance with one or more embodiments of this disclosure.

As described herein and further shown in FIG. 12C, the system can further include a privacy rule engine (e.g., filtering operations) to ensure that extraneous data that is not needed by the organization is not transmitted to the organization. For example, the privacy rule engine can include temporal rules, e.g., to permitting only data for the next two weeks to be transmitted, and to prevent data during the user's personal time to from being shared. Similarly, the privacy rule engine can include context rules, such as only enabling skills relating to specific projects to be shared. The privacy rule engine can also include granularity rules, such as to share categories of data rather than the details, and to prevent sharing of individual patterns. As described herein, the management of the ontology and/or the rules can be limited to the user, e.g., via an on-chain program that is controlled by a wallet owned by the user. FIG. 12D shows an illustrative feedback loop and conflict resolution system, in accordance with one or more embodiments of this disclosure. According to some implementations, the user-specific agentic model can perform tasks as well as generate responses responsive to requests. For example, the agentic model can further generate notifications for daily activities of the user, measure user outcomes and measure personal metrics. The user-specific agentic model can push the measured user outcomes and personal metrics, in a user-agnostic, high-level manner. Thus, the user-specific agentic model can push, via the secure communication session, insights and patterns.

Similarly, the entity-specific agentic model can generate recommendations, organizational metrics, and track team-specific results. The entity-specific agentic model can push context and opportunities to the user-specific agentic model. For example, context can include data regarding hierarchy, team members, etc., which the user-specific agentic model can use to further clarify and resolve requests.

According to some implementations, the environment can further include a conflict detection and resolution engine, which can be executed at least in part on the user device, the entity device, or both. The conflict detection and resolution engine can identify discrepancies between data of the user-specific ontology and/or data store and generate recommendations for resolving the discrepancies, such as to the user device or entity device. In one example, the engine can detect that there is a goal misalignment as an urgent deadline is needed, but the user (e.g., employee) has a personal goal of strict adherence to work-life balance. In this example, the system can set up, for example, a negotiation user interface through which the entity and user can negotiate, via messaging, for example, a resolution (e.g., pushing a deadline, identifying another employee to help, etc.).

Similarly, if the user has a skill they need to develop and the organization identifies an immediate need for the skill to be developed, the engine can identify this and resolve it by providing the user with time allocated for learning the skill. Additionally, or alternatively, if the system identifies that the user wishes to have privacy, and the organization requires data for analytics, the engine can identify that anonymization is needed and perform anonymization. As shown in the example of FIG. 12D, the resolution process can include detecting differences in user-specific ontology elements and entity-specific ontology elements, analyzing the difference, presenting the difference to the user or entity via respective devices, and resolving the difference, such as by performing one or more operations or generating and submitting recommendations to the user or entity.

Figure 12E:
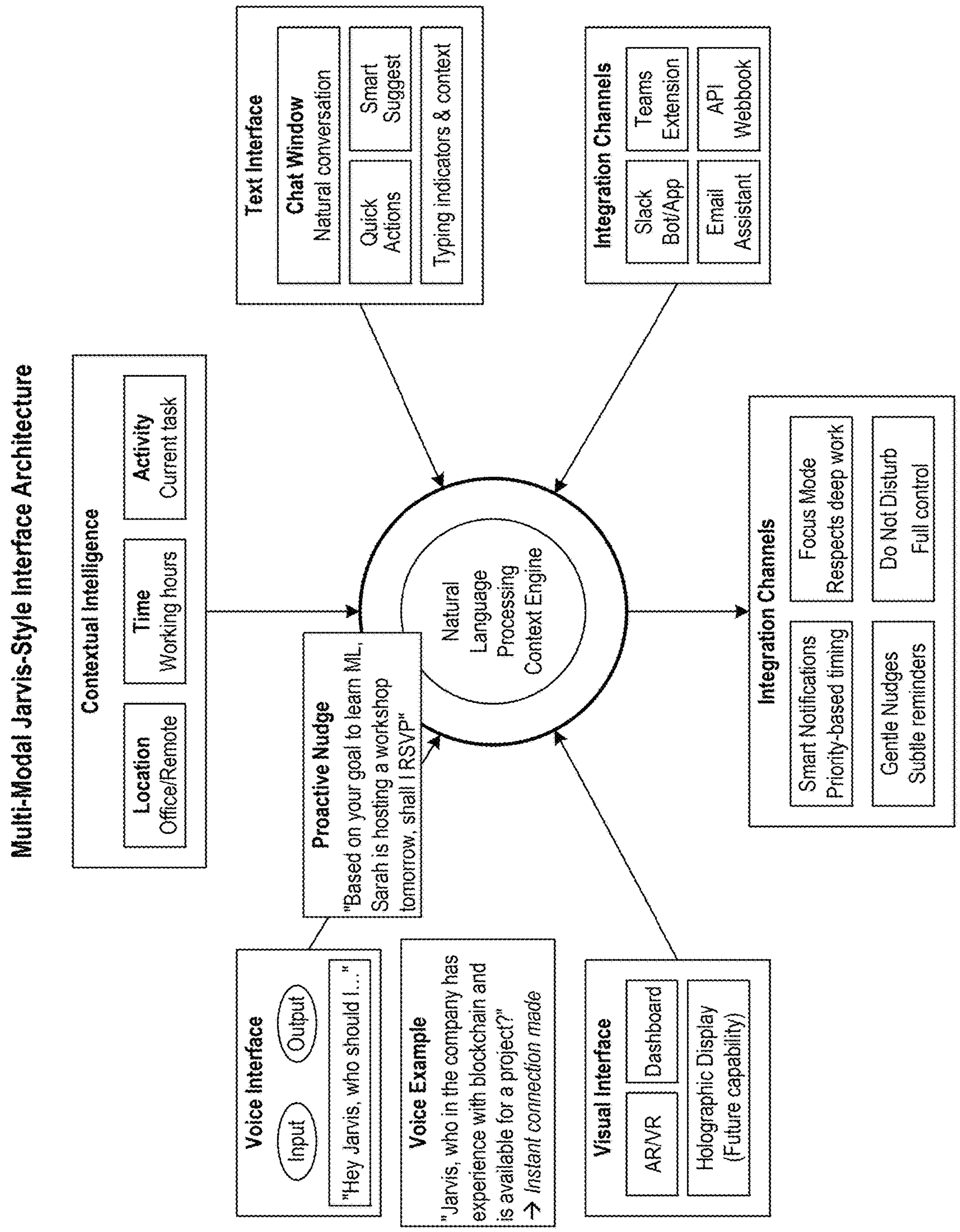
FIG. 12E shows an illustrative multimodal interaction interface architecture, in accordance with one or more embodiments of this disclosure.

FIG. 12E shows an illustrative multimodal interaction interface architecture, in accordance with one or more embodiments of this disclosure. The user at the user device and/or an entity at the entity device can interact with the personal AI (e.g., user-specific agentic model) as well as with the organization AI (e.g., the entity-specific agentic model) to obtain data and make requests in a variety of modalities. In some implementations, the user device and/or entity device can include or have access to a natural language processing context engine to parse, modulate, and/or transform the raw input data of a first modality to a second modality that is interpretable by the agentic models (e.g., textual). The context engine can take in contextual data "contextual intelligence" including location (e.g., office, local or remote work), time (e.g., working hours), and activity (e.g., current tasks) and consider the context in generating an output. For example, if a user asks "what time does Sarah work until," the contextual engine can consider the user's office location or current tasks to identify which Sarah the user is likely referencing and include that data as additional context of the request.

As shown in FIG. 12E, the modalities can include a textual interface. For example, a user at the user device or entity device can communicate using natural language via a chat interface. In some implementations, the chat interface can suggest quick actions or make smart suggestions for requests or actions the user can take. Additionally, or alternatively, the contextual engine can obtain a request, such as via an integration channel (e.g., Slack, Teams, email, API), executing on the user or entity device. For example, a user can make a reference to a bot application executing on a channel (e.g., "@enginebot, what time does Sarah work until?"). Additionally, or alternatively, the contextual engine can obtain a request through a visual modality. For example, the system can include or be communicatively coupled to a camera or imaging sensor that can obtain gestures or images of a user or user environment and determine a request. In particular, the system can include an AR/VR interface, dashboard, or holographic display and can use the same to output the request response.

Additionally, or alternatively, the system can include an audio modality. For example, the system can obtain, via voice input, a request for data. In some implementations, the system can also provide the request response via audio output. For example, a user at the user device can query, such as via a microphone sensor on the user device, "Who in the company has experience with blockchain and is available for a project?" Similarly, the user device, upon receiving an update from the entity device as described herein, can provide an update to the user via one or more of the described modalities. In particular, the system can output an audio output, "Based on your goal to learn ML, Sarah is hosting a workshop tomorrow. Shall I RSVP?" and pair the output audio with a visual notification.

According to some implementations, when the entity or user device receives a response to their query, the entity or user device can modulate the output modality and when the user of the device receives the response based on one or more parameters. For example, the system can detect, based on a determined priority of a response or notification, when to output. In one example, if an update is made to a project that the user is currently a part of, the system can automatically generate and output notifications relating to the project. The system can generate a queue of one or more notifications, where the notification is paired and stored with a time to output the notification and/or an output modality. The system can also generate and output reminders if a user has not addressed or dismissed generated action items. In some implementations, a user can indicate and initiate a do-not-disturb mode or focus mode. Based on the mode the user sets the device to, the system can modify or pause notifications in the queue or identify when certain notifications are of a high enough priority to output the notification.

Figure 12F:
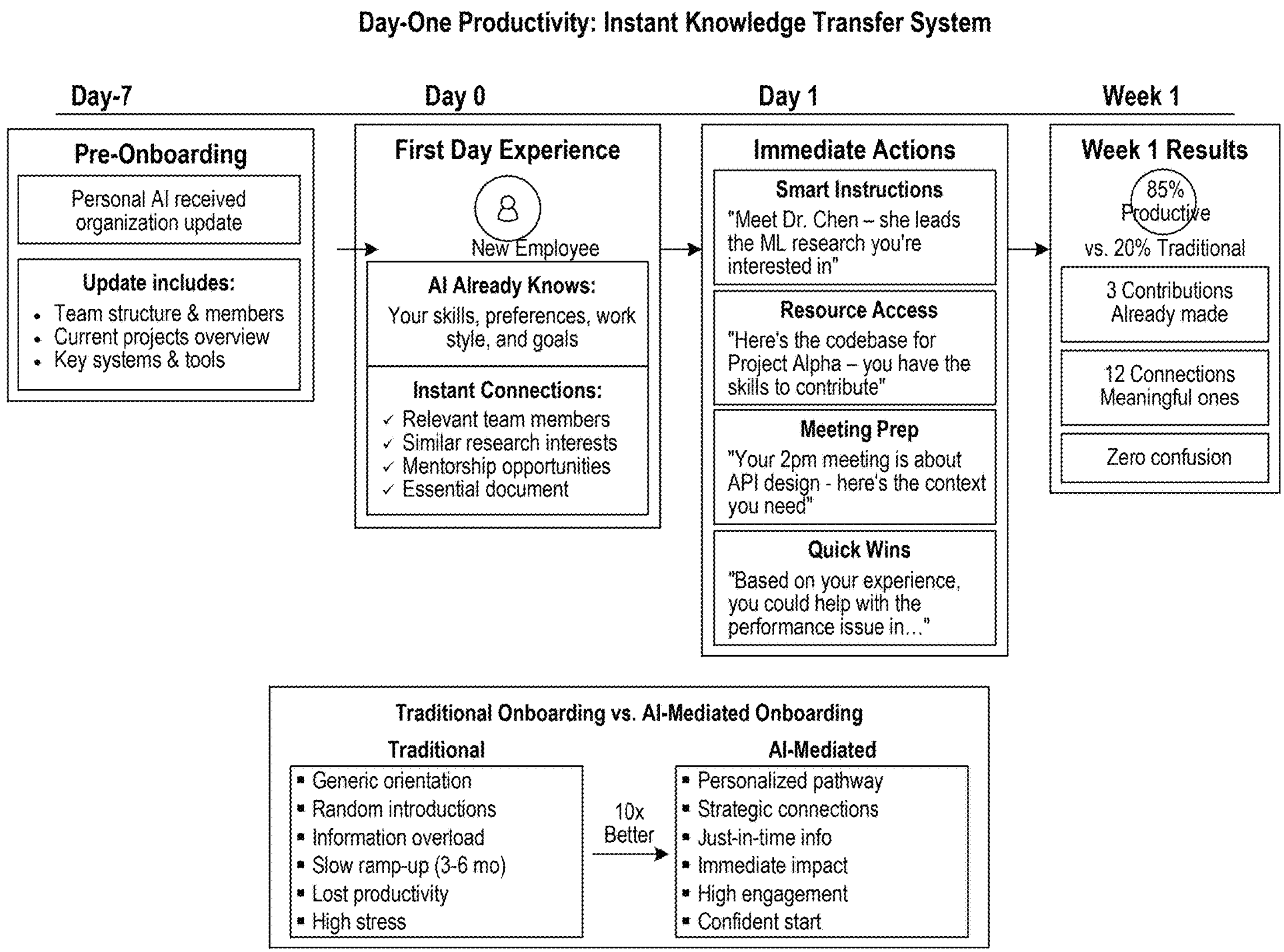
FIG. 12F shows an illustrative onboarding and knowledge transfer flow, in accordance with one or more embodiments of this disclosure.

FIG. 12F shows an illustrative onboarding and knowledge transfer flow, in accordance with one or more embodiments of this disclosure. In the example of FIG. 12F, an example process for onboarding a user to an entity is shown. In particular, when a user first becomes a member of an entity or organization, the organizational domain can obtain an update to include the user. The update can include new data added to the entity-specific ontology, such as a node in the knowledge graph corresponding to the user device and/or identifier. The update can further include the projects the user will be a part of and key systems and tools of a user. The entity-specific model can be equipped with data shared by the user-specific model, such as skills, preferences, and/or the like. The model can identify actions that the user can take, such as opportunities for mentoring, meeting team members, etc. The system can queue these action items prior to the user being formally initiated as an entity member. Upon the user being initiated as the entity member, the system can output these action items via one or more modalities. For example, the entity device can enable access to documents and can push information about connections a user should make to the user device.

In the example of FIG. 12F, the system may generate and output high-priority actions such as smart introductions, resource access, meeting prep, and quick wins. Doing so enables the user to more quickly assimilate and gain information regarding the entity as the system identifies when a user is most likely to engage and because the system can create a user-specific action item plan.

Figure 12G:
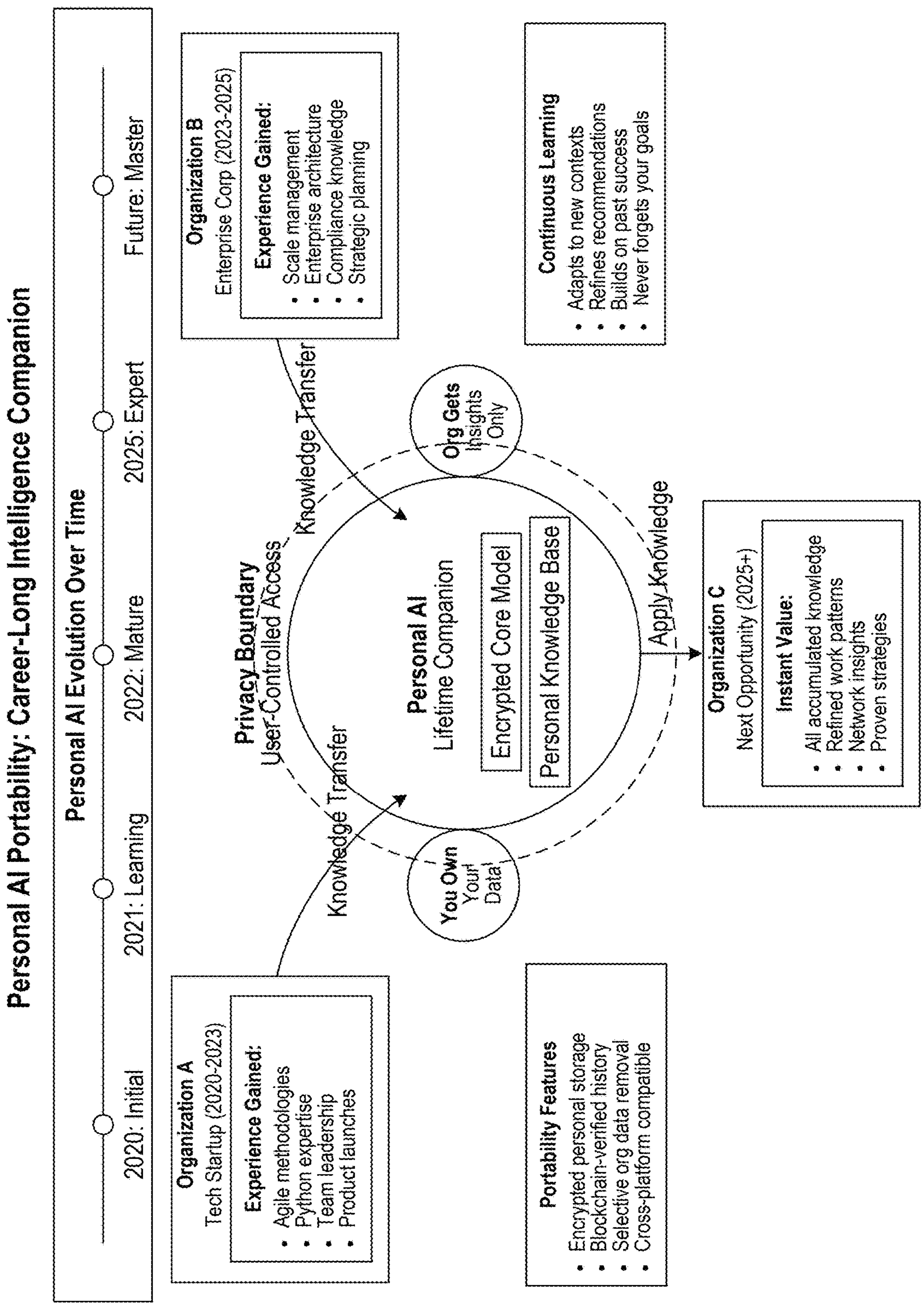
FIG. 12G shows an illustrative cross-organizational portability architecture, in accordance with one or more embodiments of this disclosure.

FIG. 12G shows an illustrative cross-organizational portability architecture, in accordance with one or more embodiments of this disclosure. As described herein, a user can belong to one or more entities over time. In the example of FIG. 12G, the user belongs to organization A from 2020-2023 and shifted from organization A to organization B from 2023-2025. During the period of time of the user's employment (e.g., association) with organization A, e.g., a first entity, the user may have gained experience in certain skills such as agile methodologies, python expertise, team leaderships, and product launches. Similarly, during the period of time of the user's employment with organization B, e.g., a second entity, the user may have gained experience in scale management, enterprise architecture, compliance knowledge, and strategic planning.

The personal AI, e.g., the user-specific agentic model, can be associated with the user over multiple different entities. In some examples, the user device 120 is a user's mobile device, e.g., a personal computer or phone, and the user may continue to use user device 120 across the years. When the user moves from organization A to organization B, the user device may receive a knowledge transfer download from the organization with high level information corresponding to the user.

According to some implementations, the new organization may not be able to obtain data relating to previous employment, or can obtain data that is user-agnostic or a simplified version having less data resolution than stored with the user. When a user moves from organization B to organization C in the year 2025, the same user-specific agentic model and ontology can continue to be used, and a new communication session between organization C and the user can be created. In so doing, the system can adapt to new contexts, refine recommendations (e.g., because previously learned data about the user is not lost), and the system can retain knowledge of your goals and other personal data, thus conserving computational resources that would otherwise be expended in recreating user information. Thus, the system can enable portability. Furthermore, because the user data and access are blockchain-verifiable, the new organization can accept the data as being unmodified and accurate. In some implementations, prior to moving entities, e.g., from organization B to organization C, the entity device can generate a request to the user device to delete data relating to the entity (e.g., organization B). The user device, responsive to receiving the data, can delete the relevant data from the user-specific ontology and data store.

As described herein, because the system retains knowledge of the user-specific data over time, e.g., without deleting or removing the data when moving to the next entity, the system can implement continuous learning methods to improve accuracy over time. In particular, when a user moves from entity to entity, the previous entity may require deletion of certain types of detailed, privileged data relating to the organization. Additionally or alternatively, the previous entity may transmit a package of high-level learned data relating to the user, e.g., such as positions the user held, experience gained, projects, etc. for incorporation into the user-specific ontology.

In particular, the system may use continuous learning, e.g., automated updating of model parameters and knowledge stores based on streaming data, feedback events, and operational outcomes. For example, the user-specific agentic model on the user device may persistently monitor activity data streams, e.g., new skill acquisitions, feedback on completed tasks, or changes in user preference. These updates can be processed using incremental learning algorithms (e.g., online stochastic gradient descent) and new semantic embeddings can be generated for affected ontology nodes, which are then stored in local vector databases. In some implementations, the agentic model's neural network (e.g., a fine-tuned LLM, transformer, or federated learning client) can refine its weights by ingesting labeled feedback from completed workflows. In particular, if a assigned task was not aligned with a user based on user-feedback, the models can be refined. In some implementations, for system-wide improvement, federated learning can be employed, where local models share encrypted gradient updates or model deltas (not raw data) with a centralized aggregator or entity system.

Furthermore, both user and organizational AI agents can implement feedback loop subsystems, such as using multi-armed bandit algorithms and constraint satisfaction solvers. Each feedback sample, e.g., such as a user's satisfaction with a recommended project, or an entity's metric on workflow efficiency, is transformed into structured learning events. These learning events can trigger parameter updates or ontology modifications.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims that follow. Furthermore, it should be noted that the features and limitations described in any one embodiment can be applied to any other embodiment herein, and flowcharts or examples relating to one embodiment can be combined with any other embodiment in a suitable manner, done in different orders, or done in parallel. In addition, the systems and methods described herein can be performed in real time. It should also be noted that the systems and/or methods described above can be applied to, or used in accordance with, other systems and/or methods.

The present techniques will be better understood with reference to the following enumerated embodiments:

A1. A method comprising: initializing a communication session between a user-specific agentic model executing locally at a user device and an entity-specific agentic model at an entity device, wherein the user-specific agentic model has access to a locally stored user-specific ontology comprising interaction data between a corresponding user and entity; receiving, at the user-specific agentic model via the communication session, a request from the entity device, wherein resolving the request requires access to the interaction data from the user-specific ontology; inputting the request into the user-specific agentic model to generate a query for obtaining interaction data from one or more classes of the user-specific ontology associated with the request; obtaining the interaction data from the user-specific ontology using the query; generating a set of filtering operations, wherein the set of filtering operations comprises user-set filtering operations for data transmission and one or more context-based filtering operations; applying the set of filtering operations to the interaction data to obtain filtered data and generating, using the user-specific agentic model, a response to the request with the filtered data; and transmitting, via the communication session, the response.

A2. A method comprising: initializing a communication session between a user-specific agentic model executing locally at a user device and an entity-specific agentic model at an entity device, wherein the user-specific agentic model has access to a locally stored user-specific ontology comprising interaction data between a corresponding user and one or more entities for which the user is a constituent; receiving, at the user-specific agentic model via the communication session, a request from the entity device, wherein resolving the request requires access to the interaction data from the user-specific ontology; inputting the request into the user-specific agentic model to generate (a) a query for obtaining interaction data from one or more classes of the user-specific ontology associated with the request and (b) one or more context-based filtering operations; obtaining the interaction data from the user-specific ontology using the query; generating a set of filtering operations, wherein the set of filtering operations comprises (i) user-set filtering operations for data transmission and (ii) the one or more context-based filtering operations; applying the set of filtering operations to the interaction data to obtain filtered data and generating, using the user-specific agentic model, a response to the request with the filtered data; and transmitting, via the communication session, the response.

A3. The method of any of the preceding embodiments, further comprising receiving, via the communication session, interaction data relating to the user from an entity-specific ontology stored locally on the entity device; and updating the user-specific ontology using the interaction data.

A4. The method of any of the preceding embodiments, wherein model weights of the user-specific agentic model are encrypted using homomorphic encryption.

A5. The method of any of the preceding embodiments, wherein the set of filtering operations comprises one or more of: a temporal filter configured to remove data generated during a period of time; a context-based filter configured to remove data not relevant to the request; or a data resolution filter configured to mask sensitive metadata and generate generalized data.

A6. The method of any of the preceding embodiments, further comprising: obtaining, at the user device, one or more user inputs; generating, using the one or more user inputs, at least one user-set filtering operation; and generating an on-chain program storing user-set filtering operations; and transmitting, to a node of a blockchain, the on-chain program for deployment.

A7. The method of any of the preceding embodiments, further comprising: determining that the request cannot be resolved without requisite interaction data that is filtered out when applying the user-set filtering operations; generating a notification with an actionable element for display at the user device, wherein the actionable element is configured to enable the requisite interaction data to be used in generating the response upon selection of the user; obtaining an indication of user selection of the actionable element; and appending the requisite interaction data to the filtered data.

A8. One or more tangible, non-transitory, computer-readable media storing instructions that, when executed by a data processing apparatus, cause the data processing apparatus to perform operations comprising those of any of embodiments A1-7.

A9. A system comprising: one or more processors; and memory storing instructions that, when executed by the one or more processors, cause the processors to effectuate operations comprising those of any of embodiments A1-7.

A10. A system comprising means for performing any of embodiments A1-7.

A11. A system comprising cloud-based circuitry for performing any of embodiments A1-7.

What is claimed is:

1. A system for secure data-retrieval using isolated ontologies, the system comprising:

one or more processors; and one or more non-transitory, computer-readable storage media storing instructions, which, when executed by the one or more processors, cause the one or more processors to perform operations comprising:

initializing a communication session between a user-specific agentic model executing locally at a user device and an entity-specific agentic model at an entity device, wherein the user-specific agentic model has access to a user-specific ontology comprising interaction data between a corresponding user and one or more entities for which a user associated with the user device is a constituent;

obtaining, at the user device, one or more user inputs;

generating, using the one or more user inputs, at least one user-set filtering operation;

generating an on-chain program storing user-set filtering operations;

transmitting, to a node of a blockchain, the on-chain program for deployment;

receiving, at the user-specific agentic model via the communication session, a request from the entity device, wherein resolving the request requires access to the interaction data from the user-specific ontology;

inputting the request into the user-specific agentic model to generate (a) a query for obtaining interaction data from one or more classes of the user-specific ontology associated with the request and (b) one or more context-based filtering operations;

obtaining the interaction data from the user-specific ontology using the query;

generating a set of filtering operations, wherein the set of filtering operations comprises (i) user-set filtering operations for data transmission and (ii) the one or more context-based filtering operations;

applying the set of filtering operations to the interaction data to obtain filtered data and generating, using the user-specific agentic model, a response to the request with the filtered data; and transmitting, via the communication session, the response.

2. The system of claim 1, wherein the instructions further cause the one or more processors to perform operations comprising:

receiving, via the communication session, interaction data relating to the user from an entity-specific ontology stored locally on the entity device; and updating the user-specific ontology using the interaction data.

3. The system of claim 1, wherein model weights of the user-specific agentic model are encrypted using homomorphic encryption.

4. The system of claim 1, wherein the set of filtering operations comprises one or more of:

a temporal filter configured to remove data generated during a period of time;

a context-based filter configured to remove data not relevant to the request; or a data resolution filter configured to mask sensitive metadata and generate generalized data.

5. The system of claim 1, wherein the instructions further cause the one or more processors to perform operations comprising obtaining the user-set filtering operations for data transmission by:

transmitting, to the node of the blockchain, a call to a function of the on-chain program storing user-set filtering operations; and obtaining, from the node, one or more user-set filtering operations.

6. The system of claim 1, wherein the instructions further cause the one or more processors to perform operations comprising:

determining that the request cannot be resolved without requisite interaction data that is filtered out when applying the user-set filtering operations;

generating a notification with an actionable element for display at the user device, wherein the actionable element is configured to enable the requisite interaction data to be used in generating the response upon selection of the user;

obtaining an indication of user selection of the actionable element; and appending the requisite interaction data to the filtered data.

7. The system of claim 1, wherein the instructions further cause the one or more processors to perform operations comprising: generating a sequence of the set of filtering operations based on a number of conditions of each filtering operation of the set of filtering operations.

8. A method for secure data-retrieval using isolated ontologies, the method comprising:

initializing a communication session between a user-specific agentic model executing locally at a user device and an entity-specific agentic model at an entity device, wherein the user-specific agentic model has access to a user-specific ontology locally stored on the user device and comprising interaction data between a user at the user device and entity;

obtaining, at the user device, one or more user inputs;

generating, using the one or more user inputs, at least one user-set filtering operation;

generating an on-chain program storing user-set filtering operations;

transmitting, to a node of a blockchain, the on-chain program for deployment;

receiving, at the user-specific agentic model via the communication session, a request from the entity device, wherein resolving the request requires access to the interaction data from the user-specific ontology;

inputting the request into the user-specific agentic model to generate a query for obtaining interaction data from one or more classes of the user-specific ontology associated with the request;

obtaining the interaction data from the user-specific ontology using the query;

generating a set of filtering operations, wherein the set of filtering operations comprises user-set filtering operations for data transmission and one or more context-based filtering operations;

applying the set of filtering operations to the interaction data to obtain filtered data and generating, using the user-specific agentic model, a response to the request with the filtered data; and transmitting, via the communication session, the response.

9. The method of claim 8, further comprising:
receiving, via the communication session, interaction data relating to the user from an entity-specific ontology stored locally on the entity device; and
updating the user-specific ontology using the interaction data.

10. The method of claim 8, wherein model weights of the user-specific agentic model are encrypted using homomorphic encryption.

11. The method of claim 8, wherein the set of filtering operations comprises one or more of:
a temporal filter configured to remove data generated during a period of time;
a context-based filter configured to remove data not relevant to the request; or
a data resolution filter configured to mask sensitive metadata and generate generalized data.

12. The method of claim 8, further comprising:
determining that the request cannot be resolved without requisite interaction data that is filtered out when applying the user-set filtering operations;
generating a notification with an actionable element for display at the user device, wherein the actionable element is configured to enable the requisite interaction data to be used upon selection of the user in generating the response;
obtaining an indication of user selection of the actionable element; and
appending the requisite interaction data to the filtered data.

13. The method of claim 8, further comprising: generating a sequence of the set of filtering operations based on a number of conditions of each filtering operation of the set of filtering operations.

14. One or more non-transitory, computer-readable media comprising instructions recorded thereon that, when executed by one or more processors, cause operations for secure data-retrieval using isolated ontologies, comprising:
initializing a communication session between a user-specific agentic model executing locally at a user device and an entity-specific agentic model at an entity device, wherein the user-specific agentic model has access to a user-specific ontology comprising interaction data between a user of the user device and entity;
obtaining, at the user device, one or more user inputs;
generating, using the one or more user inputs, at least one user-set filtering operation;
generating an on-chain program storing user-set filtering operations;
transmitting, to a node of a blockchain, the on-chain program for deployment;
receiving, at the user-specific agentic model via the communication session, a request from the entity device, wherein resolving the request requires access to the interaction data from the user-specific ontology;
inputting the request into the user-specific agentic model to generate a query for obtaining interaction data from one or more classes of the user-specific ontology associated with the request;
obtaining the interaction data from the user-specific ontology using the query;
generating a set of filtering operations, wherein the set of filtering operations comprises user-set filtering operations for data transmission and one or more context-based filtering operations;
applying the set of filtering operations to the interaction data to obtain filtered data and generating, using the user-specific agentic model, a response to the request with the filtered data; and
transmitting, via the communication session, the response.

15. The one or more non-transitory, computer-readable media of claim 14, wherein the instructions further cause the one or more processors to perform:
receiving, via the communication session, interaction data relating to the user from an entity-specific ontology stored locally on the entity device; and
updating the user-specific ontology using the interaction data.

16. The one or more non-transitory, computer-readable media of claim 14, wherein model weights of the user-specific agentic model are encrypted using homomorphic encryption.

17. The one or more non-transitory, computer-readable media of claim 14, wherein the set of filtering operations comprises one or more of:
a temporal filter configured to remove data generated during a period of time;
a context-based filter configured to remove data not relevant to the request; or
a data resolution filter configured to mask sensitive metadata and generate generalized data.

18. The one or more non-transitory, computer-readable media of claim 14, wherein the instructions further cause the one or more processors to perform comprising obtaining the user-set filtering operations for data transmission by:
transmitting, to the node of the blockchain, a call to a function of the on-chain program storing user-set filtering operations; and
obtaining, from the node, one or more user-set filtering operations.

19. The one or more non-transitory, computer-readable media of claim 14, wherein the instructions further cause the one or more processors to perform:
determining that the request cannot be resolved without requisite interaction data that is filtered out when applying the user-set filtering operations;
generating a notification with an actionable element for display at the user device, wherein the actionable element is configured to enable the requisite interaction data to be used upon selection of the user in generating the response;
obtaining an indication of user selection of the actionable element; and
appending the requisite interaction data to the filtered data.

20. The one or more non-transitory, computer-readable media of claim 14, wherein the instructions further cause the one or more processors to perform: generating a sequence of the set of filtering operations based on a number of conditions of each filtering operation of the set of filtering operations.

* * * * *